United States Patent
Cao et al.

(10) Patent No.: US 12,085,212 B1
(45) Date of Patent: Sep. 10, 2024

(54) PIPELINE SUPPORT DEVICES FOR PREVENTING MELTING AND SINKING BASED ON GAS HEAT EXCHANGE

(71) Applicant: NORTHWEST INSTITUTE OF ECO-ENVIRONMENT AND RESOURCES, CAS, Gansu (CN)

(72) Inventors: Yapeng Cao, Lanzhou (CN); Guoyu Li, Lanzhou (CN); Changqing Li, Lanzhou (CN); Kai Gao, Lanzhou (CN); Dun Chen, Lanzhou (CN)

(73) Assignee: NORTHWEST INSTITUTE OF ECO-ENVIRONMENT AND RESOURCES, CAS, Lanzhou (CN)

( * ) Notice: Subject to any disclaimer, the term of this patent is extended or adjusted under 35 U.S.C. 154(b) by 0 days.

(21) Appl. No.: 18/639,942

(22) Filed: Apr. 18, 2024

(30) Foreign Application Priority Data

Aug. 16, 2023 (CN) .......................... 202311028693.0

(51) Int. Cl.
*F16L 53/70* (2018.01)
*F17D 1/08* (2006.01)
*F17D 5/00* (2006.01)

(52) U.S. Cl.
CPC .............. *F16L 53/70* (2018.01); *F17D 1/084* (2013.01); *F17D 5/00* (2013.01)

(58) Field of Classification Search
CPC ............. F16L 53/70; F17D 1/084; F17D 5/00
USPC ........................................................ 165/287
See application file for complete search history.

(56) References Cited

FOREIGN PATENT DOCUMENTS

| CN | 1480591 A | 3/2004 |
|---|---|---|
| CN | 105065916 A | 11/2015 |
| CN | 205134353 U | 4/2016 |
| CN | 110107814 A | 8/2019 |
| CN | 210319020 U | 4/2020 |
| CN | 112246934 A | 1/2021 |
| CN | 216279741 U | 4/2022 |
| CN | 115110367 A | 9/2022 |
| CN | 115198706 A | 10/2022 |
| CN | 218302507 U | 1/2023 |
| CN | 115854123 A | 3/2023 |
| JP | 2003342981 A | 12/2003 |
| RU | 2792466 C1 | 3/2023 |

OTHER PUBLICATIONS

The Second Office Action in Chinese Application No. 202311028693.0 mailed on Sep. 21, 2023, 14 pages.
(Continued)

*Primary Examiner* — Tho V Duong
(74) *Attorney, Agent, or Firm* — METIS IP LLC

(57) ABSTRACT

A pipeline support device for preventing melting and sinking based on gas heat exchange. The pipeline support device may be installed in a trench, and the pipeline support device may include a support frame and a gas heat exchange mechanism arranged on one side of the support frame. A bottom of the support frame may be fixed in the trench, a support partition may be fixed inside the support frame, the support partition separating the bottom of the support frame to form an upper chamber and a lower chamber. The gas heat exchange mechanism may include two groups of ventilation components, a group of air changing component and a group of control component. The control component may control opening and closing of ventilation openings of the ventilation pipes.

8 Claims, 15 Drawing Sheets

(56) References Cited

OTHER PUBLICATIONS

Notification to Grant Patent Right for Invention in Chinese Application No. 202311028693.0 mailed on Oct. 9, 2023, 3 pages.
First Office Action in Chinese Application No. 202311028693.0 mailed on Sep. 15, 2023, 19 pages.

PIPELINE SUPPORT DEVICES FOR PREVENTING MELTING AND SINKING BASED ON GAS HEAT EXCHANGE

CROSS REFERENCE TO RELATED APPLICATIONS

This application claims priority to Chinese Patent Application No. 202311028693.0 filed on Aug. 16, 2023, the entire contents of which are incorporated herein by reference.

TECHNICAL FIELD

The present disclosure relates to the technical field of pipeline support, and in particular to a pipeline support device for preventing melting and sinking based on gas heat exchange.

BACKGROUND

An oil pipeline system, such as a pipeline system used for the transportation of petroleum and petroleum products, may mainly consist of an oil pipeline, an oil pipeline station, and other auxiliary related devices, which is one of the main device in the oil storage and transportation industry. A shallow layer of soil at a surface (e.g., within a 2 m range) that freezes in a cold season and melts in a warm season may be called an active layer, and a layer of soil (rock) that freezes for two or more consecutive years below the active layer may be called a permafrost.

Crude oil may emit heat as it flows through an extending pipeline during transportation. The oil pipeline buried in a permafrost zone tend to melt the permafrost around the pipelines under the action of heat. Additionally, the permafrost may melt or flow under greater pressure in a special geological environment. An uneven settlement of the permafrost layer may easily bend and deform the pipeline, and in serious cases, oil leakage accidents may happen, which not only pollute the environment but also waste resources.

Crude oil pipelines may be buried underground by pipeline support devices. Most of the pipeline support devices may be simple rigid structures, which only have a simple support and fixation function, and may not effectively dissipate the heat generated by the oil pipeline.

Therefore, it is desired to provide a pipeline support device for preventing melting and sinking based on gas heat exchange, so that cold air from the outside enters into the inside of the device to cool the inside and minimize the melting of the permafrost.

SUMMARY

A purpose of the embodiments of the present disclosure is to provide a pipeline support device for preventing and controlling melting and sinking based on gas heat exchange in response to technical defects that a pipeline support device has a single function and is unable to discharge heat generated by a crude oil pipeline in a timely manner.

One or more embodiments of the present disclosure provides a pipeline support device for preventing melting and sinking based on gas heat exchange. The pipeline support device may be installed in a trench and may include a support frame and a gas heat exchange mechanism arranged on one side of the support frame.

A bottom of the support frame may be fixed in the trench, and a top of the support frame may be an arc-shaped support surface configured to support a main body of the pipeline. A support partition may be fixed inside the support frame; the support partition may separate a bottom of the support frame to form an upper chamber and a lower chamber. The two chambers may include a first chamber close to one side of the main body of the pipeline and located at an upper portion, and a second chamber close to a bottom of the trench and located at a lower portion. The support partition may be provided with a through hole.

The gas heat exchange mechanism may include two groups of ventilation components, a group of air changing component and a group of control component. Each group of the ventilation components may include a ventilation pipe, a top of each ventilation pipe being connected to a first ventilation opening, a middle-lower of the each ventilation pipe being provided with a second ventilation opening, and a bottom of the each ventilation pipe being provided with a third ventilation opening. The second ventilation openings of the two ventilation pipes may be both communicated with the first chamber, and the third ventilation openings of the two ventilation pipes may be communicated with the second chamber; the air changing component may be driven by cold air to open. When the air changing component is opened, the two ventilation pipes may be used for ventilation, one of the two ventilation pipes may be used as an air inlet pipe, and the other may be used as an air outlet pipe. At the same time, the air changing component may drive an action of the control component. The control component may control the ventilation pipe which is used as the second ventilation opening of the air inlet pipe to close, and the third ventilation opening of the ventilation pipe which is used as the air inlet pipe to open, and control the second ventilation opening of the ventilation pipe which is used as to open, and the third ventilation opening of the ventilation pipe which is used as the air outlet pipe to close.

In some embodiments, the main body of the pipeline may be fixed to the arc-shaped support surface through an arc-shaped hoop and a bolt.

In some embodiments, the pipeline support device may further be provided with a through hole located on a side away from the second ventilation opening.

In some embodiments, the two ventilation pipes may be arranged in parallel and adjacent to each other, and the first ventilation opening may be a trumpet-shaped opening. Opening directions of the first ventilation openings at the top of the two ventilation pipes may be opposite to each other. An opening side of each of the two first ventilation opening may be an orifice plate uniformly provided with through holes, and a bottom surface of the trumpet-shaped opening may be a downward slope, a strip opening may be provided between the orifice plate and the slope.

In some embodiments, the air changing component may include a first rotating shaft and baffles respectively fixed on two sides of the first rotating shaft. The first rotating shaft may be rotatably arranged on two adjacent side wall plates of the two ventilation pipes, or the first rotating shaft may be rotatably arranged on a side wall plate shared by the two ventilation pipes. The two baffles of the air changing component may be respectively located in the two ventilation pipes.

In some embodiments, each of two ends of the first rotating shaft may be respectively fixedly connected to a connecting shaft, and the connecting shaft may be rotatably installed on an inner wall of the ventilation pipe, a torsion spring may be installed on an outer wall of the connecting shaft.

In some embodiments, a top surface and a bottom surface of each baffle may be provided with an elastic component, respectively, and an interior of the elastic component may be filled with gas that expands with heat and contracts with cold. When the elastic component expands, a gap between the baffle and the ventilation pipe may be blocked.

In some embodiments, the control component may include a connecting plate driven by the first rotating shaft. The connecting plate may control two first windshields respectively through two groups of unidirectional driving structures; and the two first windshields may respectively control switches of the two second ventilation openings. A bottom of each first windshield may be fixedly connected to a second windshield through a connecting rod. The second windshield may be perpendicular to the first windshield. The two second windshields may respectively control switches of the two third ventilation openings. In an initial state, the first windshield may block the second ventilation openings, and the second ventilation openings may not be ventilated, the second windshields may not block the third ventilation openings, and the third ventilation openings may be opened for ventilation.

In some embodiments, the first rotation shaft may drive the connecting plate to move left and right through the unidirectional driving structure. The unidirectional driving structure may include a gear coaxially fixed on one side of the connecting shaft and a first rack plate fixed on a top of the connecting plate. The gear may be meshed and connected to the first rack plate.

In some embodiments, each group of the unidirectional driving structure may include a second rack plate fixed on the connecting plate, a rotating rod fixed on a top of the first windshield, and a tooth block structure arranged on a top of the rotating rod and arranged in a circumferential direction along the rotating rod. The tooth block structure may cooperate with the second rack plate to form a unidirectional driving. A top side wall of the rotating rod may be provided with a groove arranged in the circumferential direction. Each of the tooth block structures may include a second rotating shaft rotatably arranged in the groove, a tooth block fixed on the second rotating shaft and rotates with the second rotating shaft, and a spring arranged between the tooth block and an inner wall of the groove. One side of the tooth block protruding from the rotating rod may be a slope cooperating with a tooth surface on the second rack plate. Directions of the slopes on the tooth blocks at the tops of two rotating rods may be opposite to each other, and distribution positions of the springs on the two rotating rods may be opposite to the distribution positions of the tooth blocks.

Beneficial effects of embodiments of the present disclosure may include, but not limited to:

Through a coordination of the ventilation component, the air changing component, and the control component, when the cold air enters the ventilation pipe, the gas may come into contact with the baffle, which drives the baffle to rotate around the first rotating shaft. When the baffle in one of the ventilation pipes rotates downward, the first baffle in that pipe may not rotate, while the first baffle in the other pipe rotates. This configuration allows the cold air to be discharged from the third ventilation opening of the ventilation pipe into the inside of the second chamber below the partition, and the air above the partition to be discharged from the second ventilation opening of the other ventilation pipe, thereby completing the air exchange process. Furthermore, it allows the cold air from outside to enter the device and cool the inside, preventing the continuous emission of heat from crude oil as it flows through the pipeline during transportation over an extended period, and preventing the situation where the pipeline, buried in the multi-year permafrost area, from causing the surrounding permafrost to melt due to the heat. By employing the gas heat exchange mechanism in the embodiments of the present disclosure, the melting of the permafrost layer may be minimized, thereby reducing a likelihood of bending and deformation of the pipeline.

BRIEF DESCRIPTION OF THE DRAWINGS

These exemplary embodiments are not limiting, and in these embodiments, the same reference numbers denote the same structures, wherein: These embodiments are not limiting, and in these embodiments, the same numbering denotes the same structure, wherein.

Labeling in the accompanying drawings: 1, main body of the pipeline; 2, trench; 3, support frame; 4, partition; 5, ventilation pipe; 6, first ventilation opening; 7, second ventilation opening; 8, third ventilation opening; 9, the first rotating shaft; 10, the connecting shaft; 11, the baffle; 12, elastic component; 13, first windshield; 14, rotating rod; 15, torsion spring; 16, gear; 17, first rack plate; 18, connecting plate; 19, second rack plate; 20, tooth block; 21, second rotating shaft; 22, spring; 23, the connecting rod; 24, the second windshield; 5a, the first ventilation pipe; 5b, the second ventilation pipe; 25, the air supply outlet; 26, the air door; 27a, open position of electric control baffle; 27b, the closed position of electric control baffle.

DETAILED DESCRIPTION

The accompanying drawings, which are to be used in the description of the embodiments, are briefly described below. The accompanying drawings do not represent the entirety of the embodiments.

As used herein, the "system", "device", "unit" and/or "module" are used as a way to distinguish between different levels of components, elements, parts, sections, or assemblies. The words may be replaced by other expressions if other words accomplish the same purpose.

As shown in the present disclosure and in the claims, unless the context clearly suggests an exception, the words "a", "one", "a" and/or "the" are not singular, but may also include the plural. Generally, the terms "including" and "comprising" only suggest the inclusion of clearly identified steps and elements, which do not constitute an exclusive list, and the method or device may also include other steps or elements.

When describing the operations performed in the embodiments of the present disclosure in terms of the steps, the order of the steps may be interchangeable, the steps may be omitted, and other steps may be included in the process of the operation, if not otherwise specified.

Embodiment 1

Figure 1:
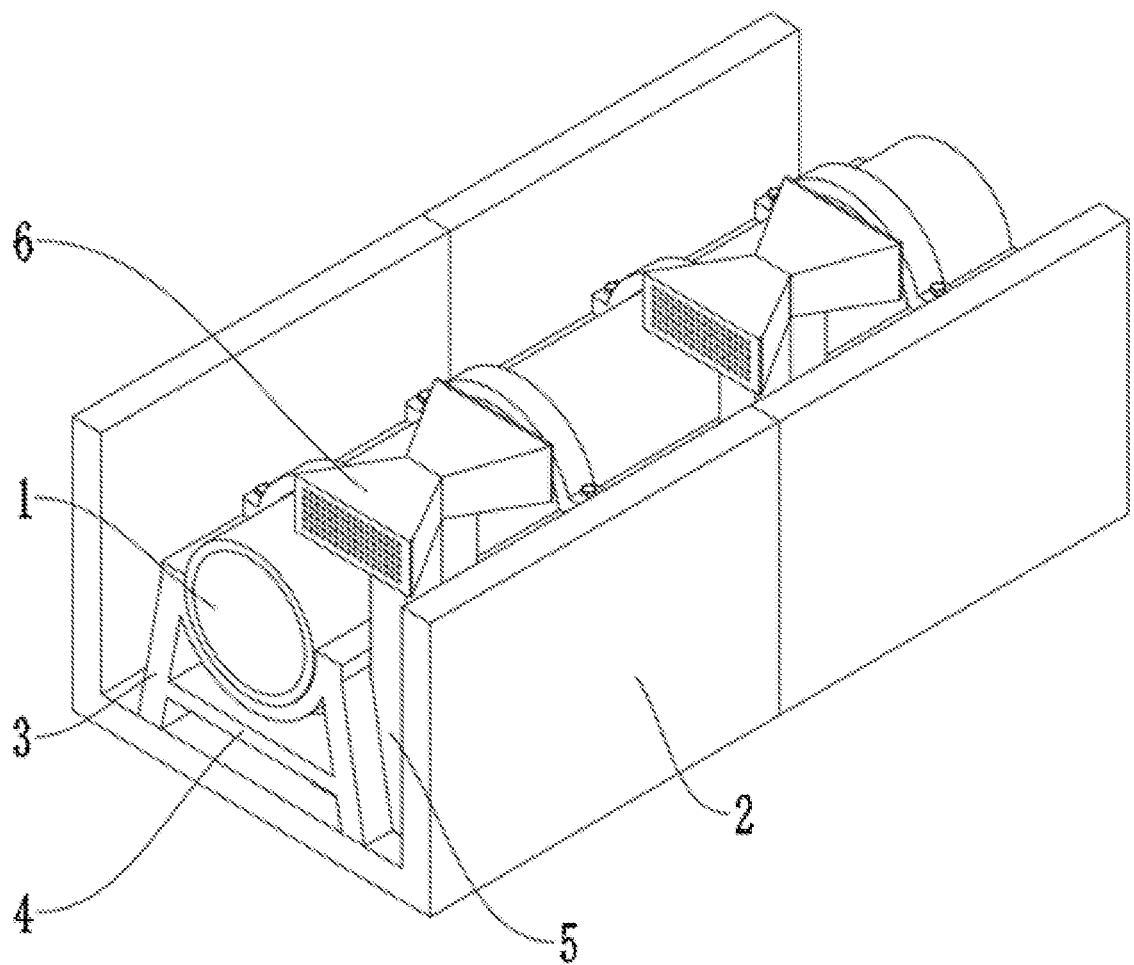
FIG. 1 is a schematic diagram illustrating an overall structure of a pipeline support device for preventing melting and sinking based on gas heat exchange according to some embodiments of the present disclosure.

FIG. 1 is a schematic diagram illustrating an overall structure of a pipeline support device for preventing melting and sinking based on gas heat exchange according to some embodiments of the present disclosure.

As shown in FIG. 1, the pipeline support device may be installed in a trench 2. The pipeline support device may include a support frame 3 and a gas heat exchange mechanism provided on one side of the support frame 3.

The trench 2 may be used for placing a main body of a pipeline 1. The main body of the pipeline 1 may be a pipeline for transporting petroleum and petroleum products. For example, the main body of the pipeline 1 may be an oil pipeline of an oil pipeline system. The support frame 3 may be provided within the trench 2 and may be used to support the main body of the pipeline 1. The gas heat exchange mechanism may be used to expel heat generated by the main body of the pipeline 1. In order to avoid that a permanent frozen soil of the permafrost layer is melted by the heat generated by the pipeline, the gas heat exchange mechanism may be used to make outside cold air enter an inside of the device to cool down the inside, so as to minimize the melting of the permafrost layer as much as possible.

In some embodiments, a bottom of the support frame 3 may be fixed within the trench 2, and a top of the support frame 3 may be an arc-shaped support surface for supporting the main body of the pipeline 1. The main body of the pipeline 1 may be a hollow cylinder, and the main body of the pipeline 1 may have a circular or oval cross-section. Thus, the top of the support frame 3 may be an arc-shaped support surface to support an arcuate periphery of the main body of the pipeline 1.

In some embodiments, the main body of the pipeline 1 may be fixed to the arc-shaped support surface by arc-shaped hoops and bolts. A shape of the arc-shaped hoop may match a shape of the main body of the pipeline 1, the main body of the pipeline 1 may be placed between the arc-shaped hoop and the arc-shaped support surface of the support frame 3, and the bolts may fasten the arc-shaped hoop to the support frame 3, thereby fixing the main body of the pipeline 1 to the arc-shaped support surface. With the arc-shaped hoop and the bolts, the main body of the pipeline 1 may be stabilized and fixed on the support frame 3 to avoid a displacement of the main body of the pipeline 1.

In some embodiments, a support partition 4 may be fixed to an inside of the support frame 3, and the support partition 4 may separate the bottom of the support frame 3 to form an upper chamber and a lower chamber. The two chambers may include a first chamber close to one side of the main body of the pipeline 1 and located at an upper portion, and a second chamber close to a bottom of the trench 2 and located at a lower portion. The first chamber may be formed by an enclosure between the support partition 4, the upper portions of both sides of the support frame 3 and the arc-shaped support surface, and the second chamber may be formed by an enclosure between the support partition 4, the bottom of both sides of the support frame 3, and a bottom surface of the trench 2. In some embodiments, the support partition 4 inside the support frame 3 may be provided with through holes. In some embodiments, the support partition 4 may be provided with one or more through holes at intervals along a pipeline extension direction.

When the main body of the pipeline 1 is installed, the gas heat exchange mechanism may allow the air outside the trench 2 to flow into the inside of the support frame 3, and the incoming cold air may cool down the main body of the pipeline 1.

Figure 11:
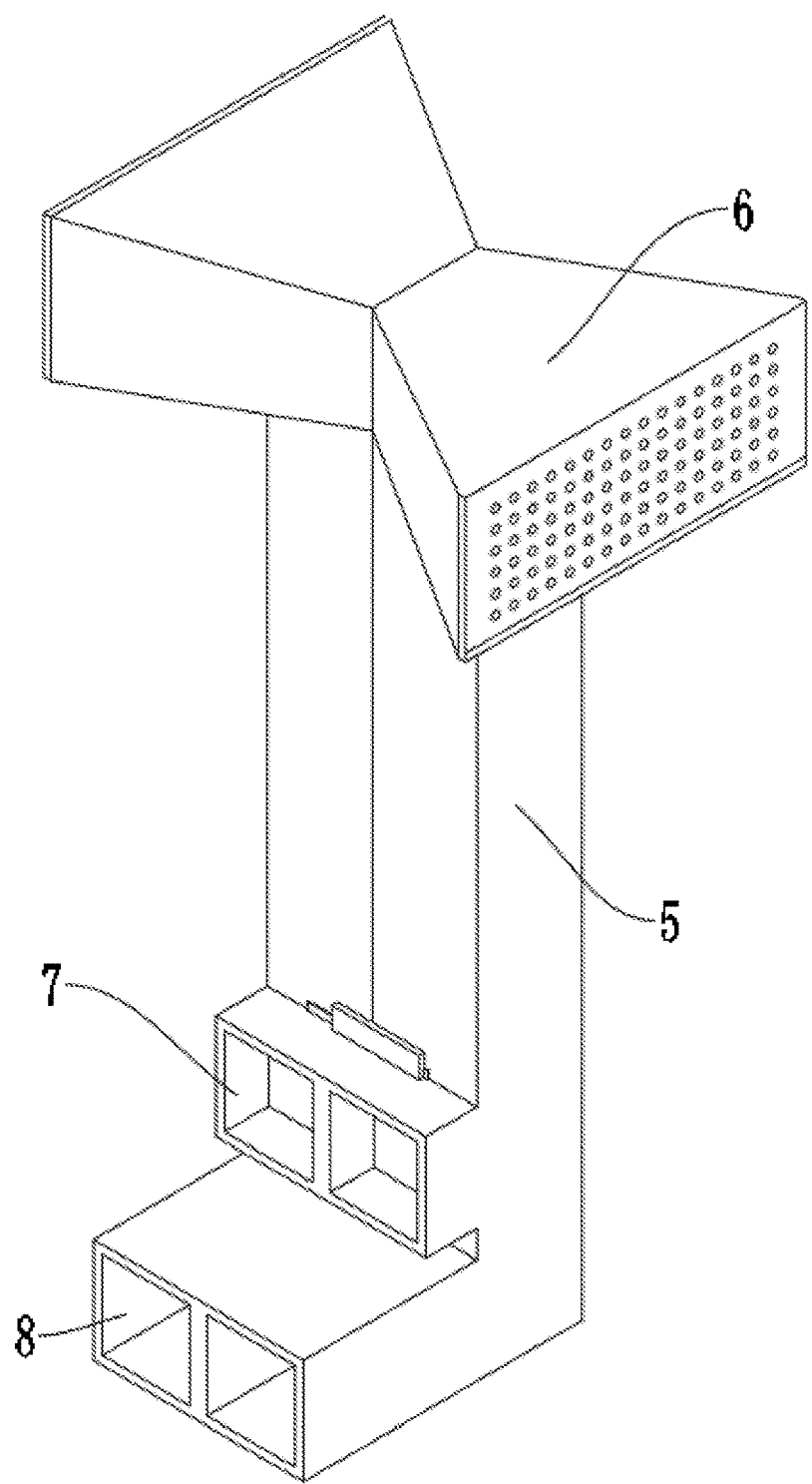
FIG. 11 is an enlarged schematic diagram at a ventilation pipe according to some embodiments of the present disclosure.

In some embodiments, the gas heat exchange mechanism may include two groups of ventilation components, one group of air changing components, and one group of control components. As illustrated in FIG. 11, in some embodiments, each group of ventilation components may include a ventilation pipe 5. Each ventilation pipe 5 may have a first ventilation opening 6 connected at a top of the ventilation pipe 5, a second ventilation opening 7 opened at a middle-lower of each ventilation pipe 5, and a third ventilation opening 8 opened at a bottom of each ventilation pipe 5.

Figure 2:
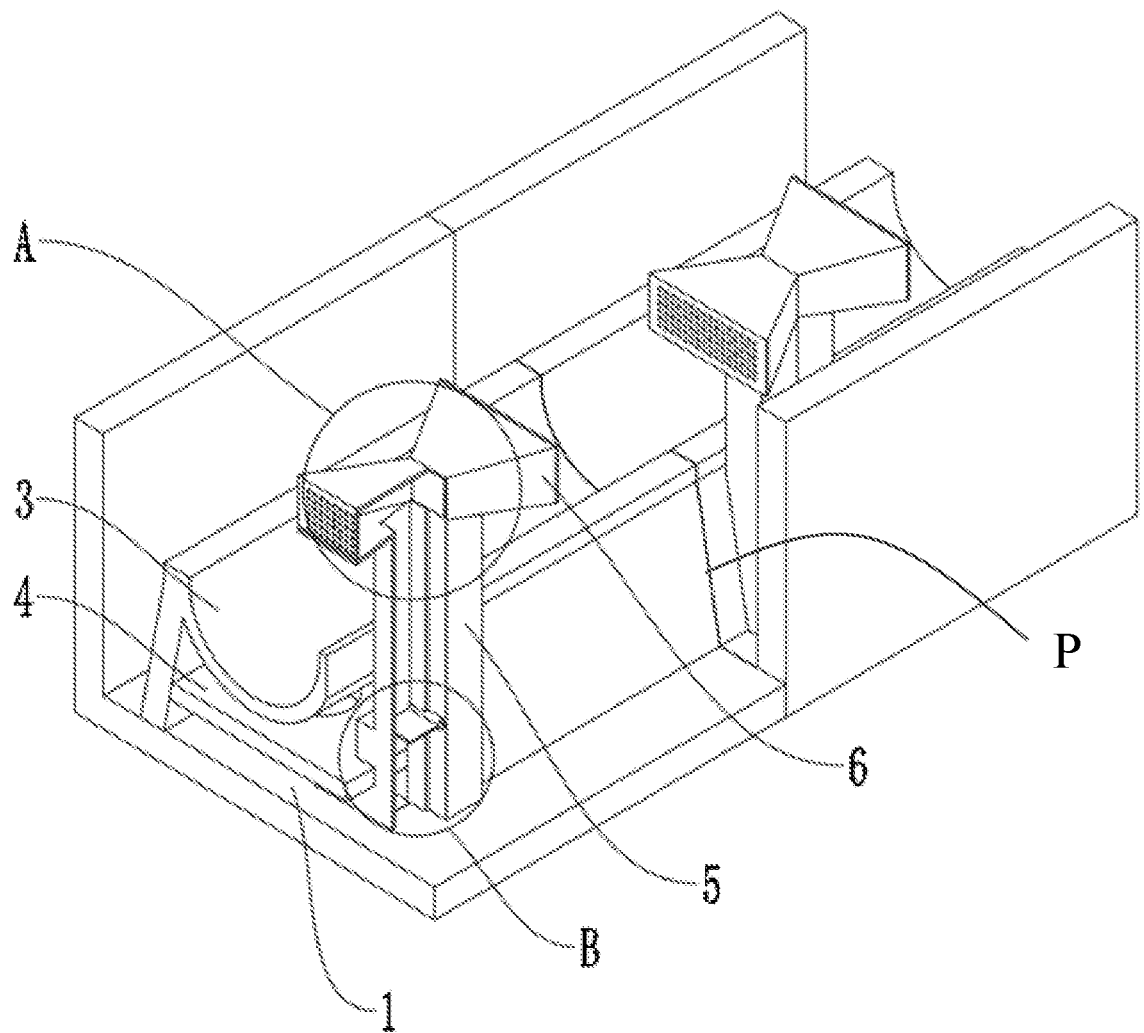
FIG. 2 is a schematic diagram illustrating a cross-sectional view of an overall structure of a pipeline support device according to some embodiments of the present disclosure.
Figure 4:
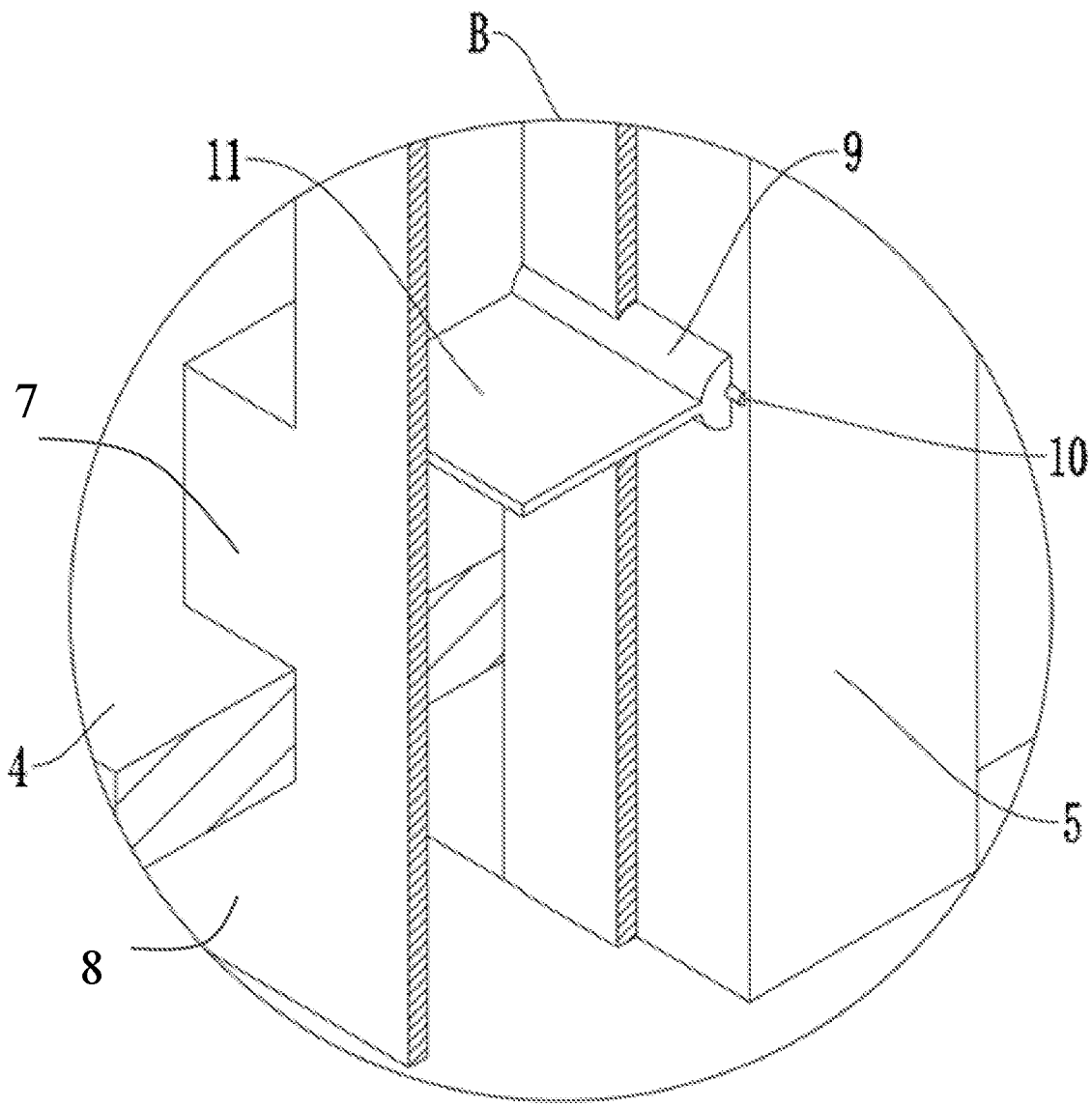
FIG. 4 is an enlarged schematic diagram at B in FIG. 2 according to some embodiments of the present disclosure.
Figure 5:
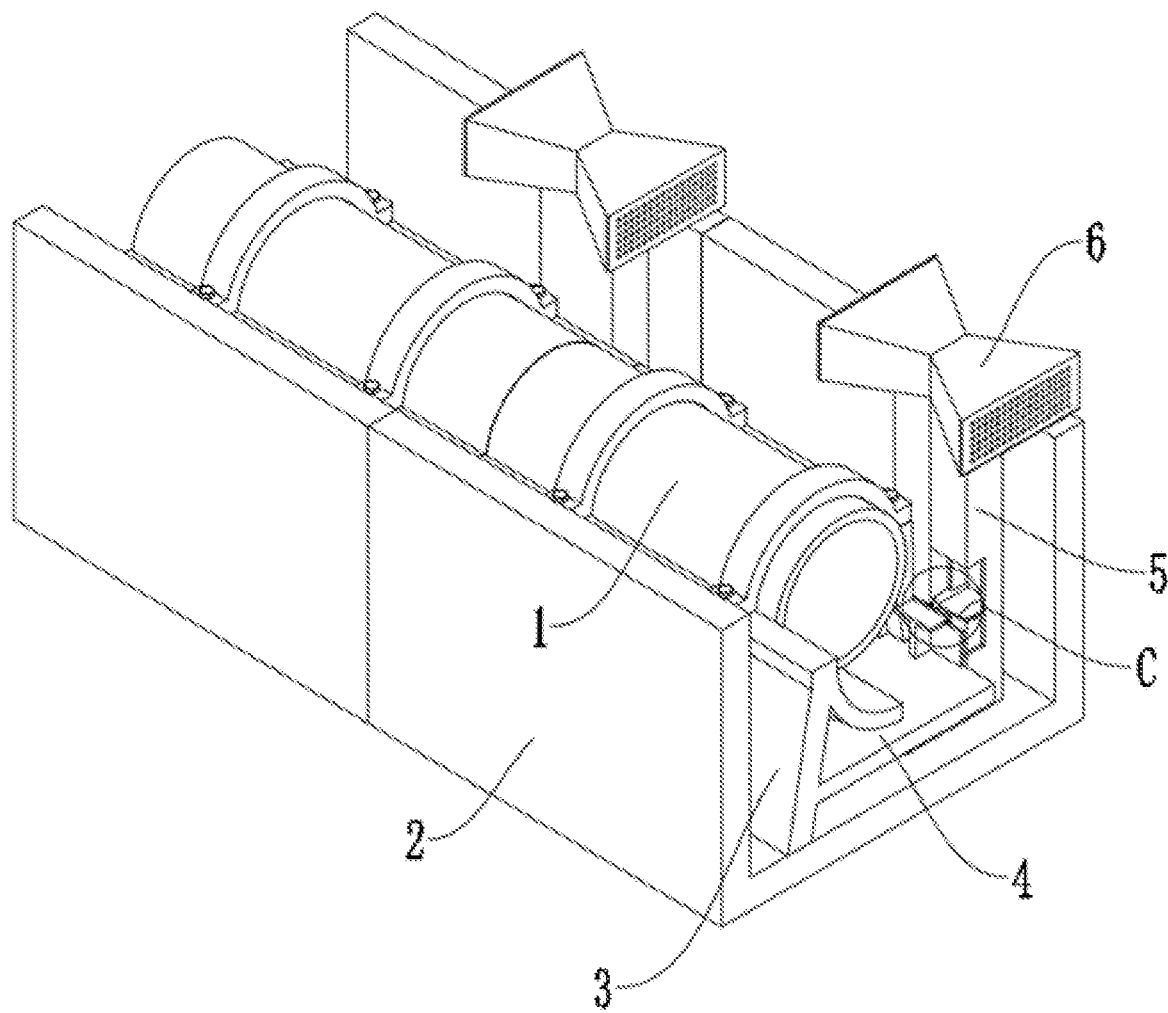
FIG. 5 is a partial cross-sectional schematic diagram illustrating another perspective of the overall structure of a pipeline support device according to some embodiments of the present disclosure.

As depicted in FIG. 2 and FIG. 5, in some embodiments, the second ventilation openings 7 of both ventilation pipes 5 of the two groups of ventilation components may be connected to the first chamber, and the third ventilation openings 8 of both ventilation pipes 5 may be connected to the second chamber. A connection portion of the ventilation pipe 5 to the support frame 3 is indicated at B in FIG. 2. FIG. 4 is an enlarged schematic view at B in FIG. 2. As shown in FIG. 4, the second ventilation opening 7 of ventilation pipe 5 may be connected to an upper side of the support partition 4, and the third ventilation opening 8 of ventilation pipe 5 may be connected to a lower side of the support partition 4.

In some embodiments, the air changing component may be actuated by cold air to turn on, and when the air changing component is turned on, two ventilation pipes 5 may be vented. While the air changing component actuates the control component to perform the action, one of the ventilation pipes 5 may be used as an air inlet pipe, and the other may be used as an air inlet pipe.

The air changing component may be used to perform an air-exchange process in conjunction with the ventilation component. The control component may be used to control parts in the air changing component to generate a gas flow path. The air changing component may drive the control component to cause the control component to control the opening or closing of the second ventilation opening 7 and the third ventilation opening 8 of the ventilation pipe 5 to make the cold air to smoothly enter from the air inlet pipe and exit from the air outlet pipe to cool the inside of the pipeline support device.

In some embodiments, the control component may control the second ventilation opening 7 of the ventilation pipe 5 that serves as the air inlet pipe to close and the third ventilation opening 8 to open, while controlling the second ventilation opening 7 of the ventilation pipe 5 that serves as the air outlet pipe to open and the third ventilation opening 8 to close.

In some embodiments, a method for preventing melting and sinking of a pipeline support device for preventing melting and sinking based on gas heat exchange may include the following steps Step S1, a pipeline support device may be installed in the trench 2.

At a location where a construction is needed, the trench 2 may be dug, the main body of the pipeline 1 may be installed inside the trench 2 using the support frame 3; the first ventilation opening 6 of the ventilation pipe 5 may be disposed higher than the top surface of trench 2 and above the ground surface, and then a soil may be backfilled.

In some embodiments, the main body of the pipeline 1 may be a multi-section welded structure. When installing the main body of the pipeline 1, a crane may be used to lift the main body of the pipeline 1 onto the arc-shaped support surface, and then the arc-shaped support surface may be used in conjunction with the arc-shaped hoop. The arc-shaped support surface may be bolted to the arc-shaped hoop to fix the main body of the pipeline 1 and the support frame 3. Then, the fixed support frame 3 and the main body of the pipeline 1 may be placed into the inside of the trench 2 to complete the installation.

Step S2, the gas heat exchange process may be accomplished through the pipeline support device.

When the air outside the trench 2 is the cold air, the air changing component of the gas heat exchange mechanism may be turned on, and the two ventilation pipes 5 may be turned on and both in a ventilated state. The two ventilation pipes 5 may include a first ventilation pipe 5a and a second ventilation pipe 5b. When the wind blows toward the first ventilation pipe 5a, flowing air enters the first ventilation pipe 5a from the first ventilation opening 6 of the first ventilation pipe 5a, with the first ventilation pipe 5a acting as the air inlet pipe and the second ventilation pipe 5b acting as an air outlet pipe.

When the air changing component is turned on, it drives an action of the control component, and the control component may control: the second ventilation opening 7 of the first ventilation pipe 5a to close, the third ventilation opening 8 of the first ventilation pipe 5a to open, or the second ventilation opening 7 of the second ventilation pipe 5b to open, and the third ventilation opening 8 of the second ventilation pipe 5b to close. In this way, the cold air may enter the pipeline of the first ventilation pipe 5a through the first ventilation opening 6 of the first ventilation pipe 5a, then enter the inside of the second chamber through the third ventilation opening 8 of the first ventilation pipe 5a. After flowing through the second chamber, the cold air may enter the first chamber through the through holes on the support partition 4, and then pass through the second ventilation opening 7 of the second ventilation pipe 5b into the inside of the second ventilation pipe 5b, and finally exits the trench 2 through the first ventilation opening 6 of the second ventilation pipe 5b to complete the air exchange. In this way, the cold air from the outside may enter the inside of the pipeline support device of the embodiment of the present disclosure, and the inside of the pipeline support device may be cooled and undergo the heat exchange.

In the embodiment of the present disclosure, through the heat exchange of the above pipeline support device, a continuous emission of heat from the crude oil may be avoided as the crude oil flows through the pipeline during transportation, and the melting of the surrounding perennial permafrost in the area where the oil pipeline is buried due to the presence of heat may be avoided. Due to a possibility of the permafrost layer melting or flowing under greater pressure and a unique geological environment, an uneven settlement of the permafrost layer may easily lead to a bending deformation of the pipeline. In severe cases, an oil leakage may happen, which not only pollutes the environment but also wastes resources. Through the heat exchange of the above pipeline support device, the melting of the permafrost layer may be minimized, thereby reducing a likelihood of pipeline bending and deformation.

Figure 7:
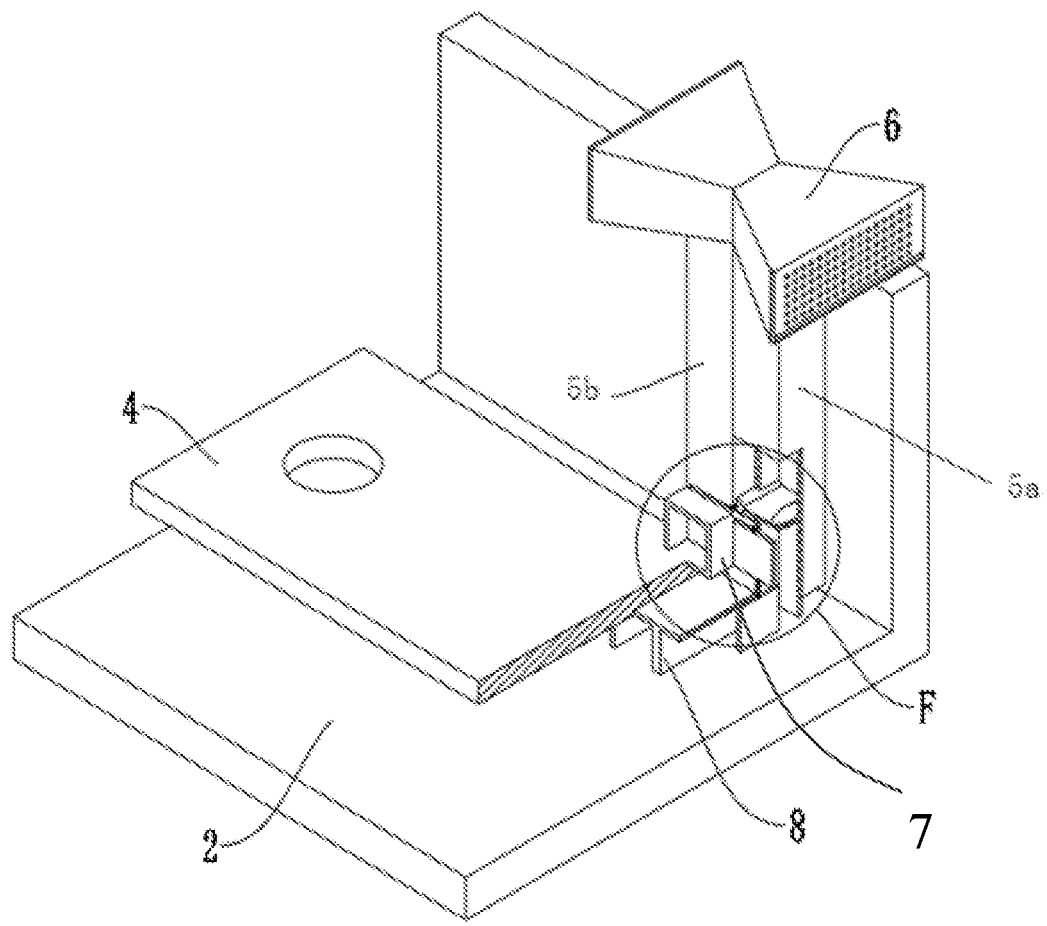
FIG. 7 is a schematic diagram illustrating a structure at a support partition according to some embodiments of the present disclosure.

In some embodiments, as shown in FIG. 7, the support partition 4 may have a through hole located on a side away from the second ventilation opening 7. The location of the through hole may allow as much cold air as possible to flow into the second chamber beneath the support partition 4 and come into contact with the trench 2.

Embodiment 2

Embodiment 2 is a further optimization of the first ventilation opening 6 based on Embodiment 1.

As shown in FIG. 11, in some embodiments, the two ventilation pipes 5 may be provided in parallel and adjacent to each other, with the first ventilation openings 6 of the two ventilation pipes 5 being trumpet-shaped openings, and with opening directions of the first ventilation openings 6 at the top of the two ventilation pipes 5 in opposite directions. The two first ventilation openings 6 with opposite directions allow the wind from different directions to enter a bottom end of the support frame 3 from the inside of the first ventilation openings 6.

Figure 3:
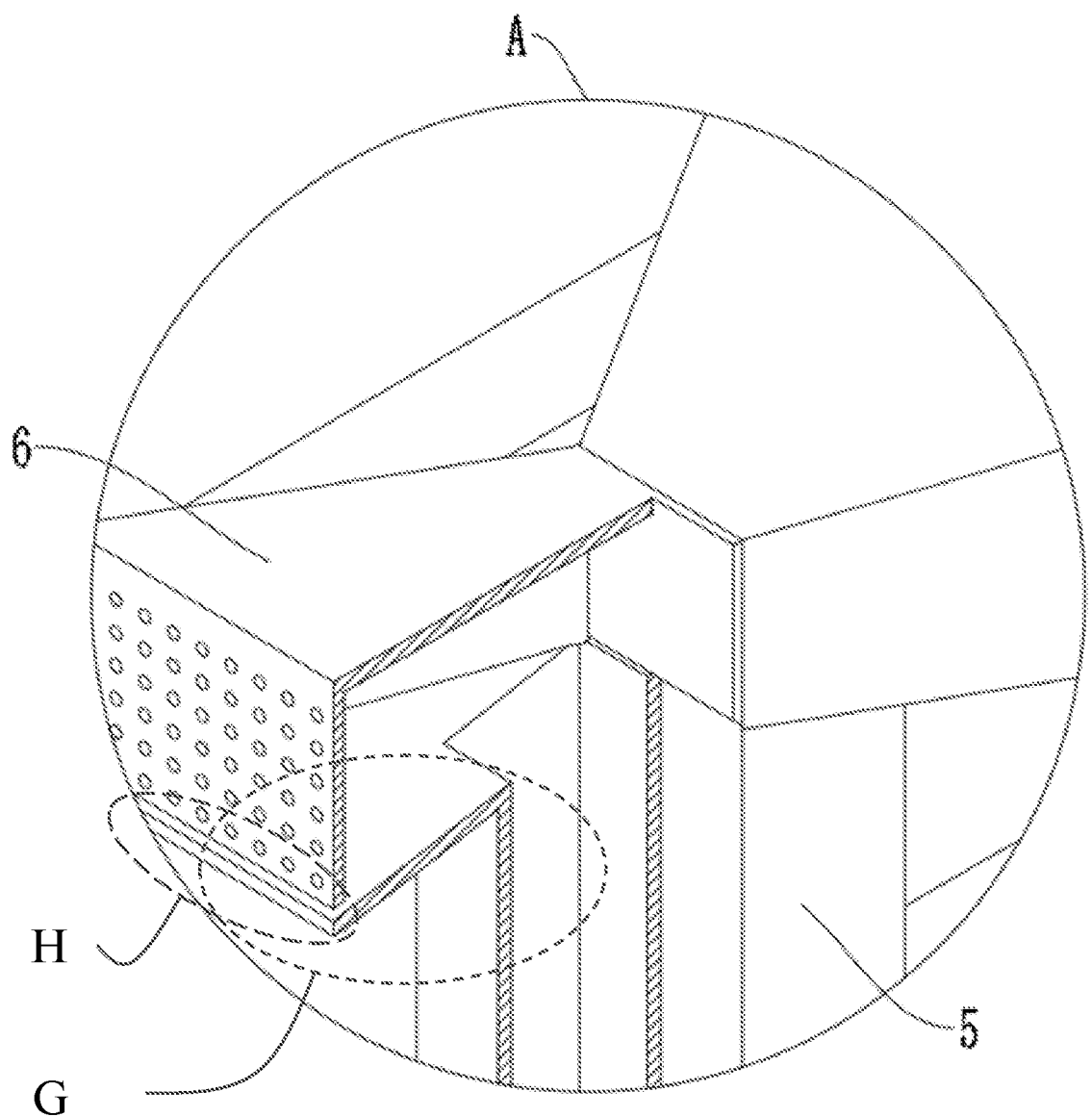
FIG. 3 is an enlarged schematic diagram at A in FIG. 2 according to some embodiments of the present disclosure.

As shown in FIGS. 1-3, in some embodiments, the opening side of the first ventilation opening 6 may be a orifice plate uniformly provided with through holes, which blocks leaves or other greater impurities from entering the inside of the ventilation pipe 5 through the first ventilation opening 6 without affecting a ventilation effect of the ventilation pipe 5.

The first ventilation opening 6 is circled at A in FIG. 2. FIG. 3 is an enlarged schematic diagram at A in FIG. 2. As shown in FIG. 3, in some embodiments, the bottom surface of the trumpet-shaped opening (circled in dotted lines at G in FIG. 3) may be a downward slope providing a diversion for rainwater. In some embodiments, there may be a bar opening (circled in dotted lines at H in FIG. 3) the first ventilation opening 6 between the orifice plate of the first ventilation opening 6 and the slope. When the rainwater enters the first ventilation opening 6, a provision of the bar opening may allow the rainwater to flow out along the slope downwardly through the bar opening, thereby preventing the rainwater from entering the ventilation pipe 5.

Embodiment 3

Embodiment 3 is a further illustration of the air changing component based on Embodiment 1.

Figure 6:
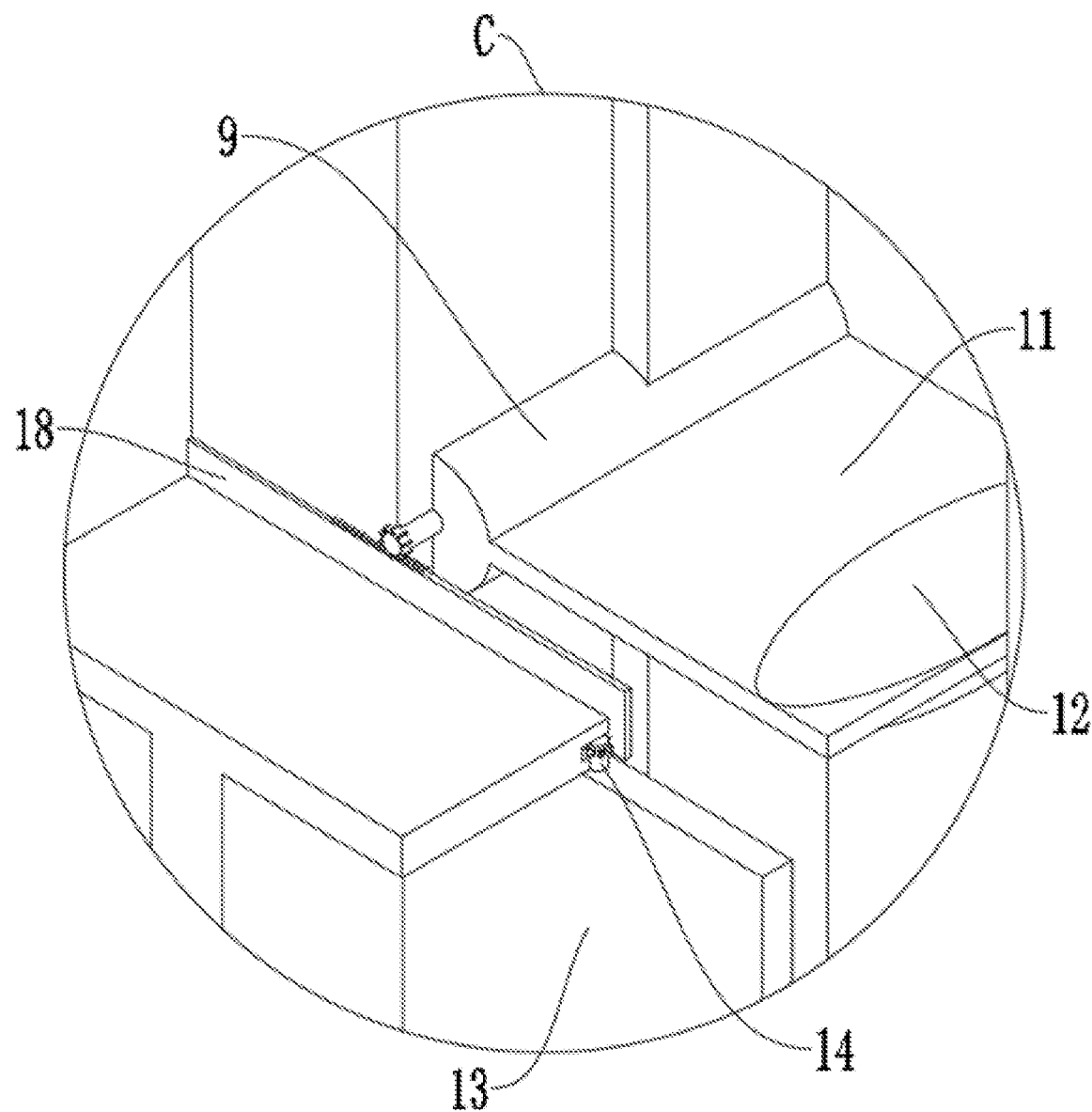
FIG. 6 is an enlarged schematic diagram at C in FIG. 5 according to some embodiments of the present disclosure.

The air changing component is circled at C in FIG. 5. FIG. 6 is an enlarged schematic diagram at C in FIG. 2.

Figure 8:
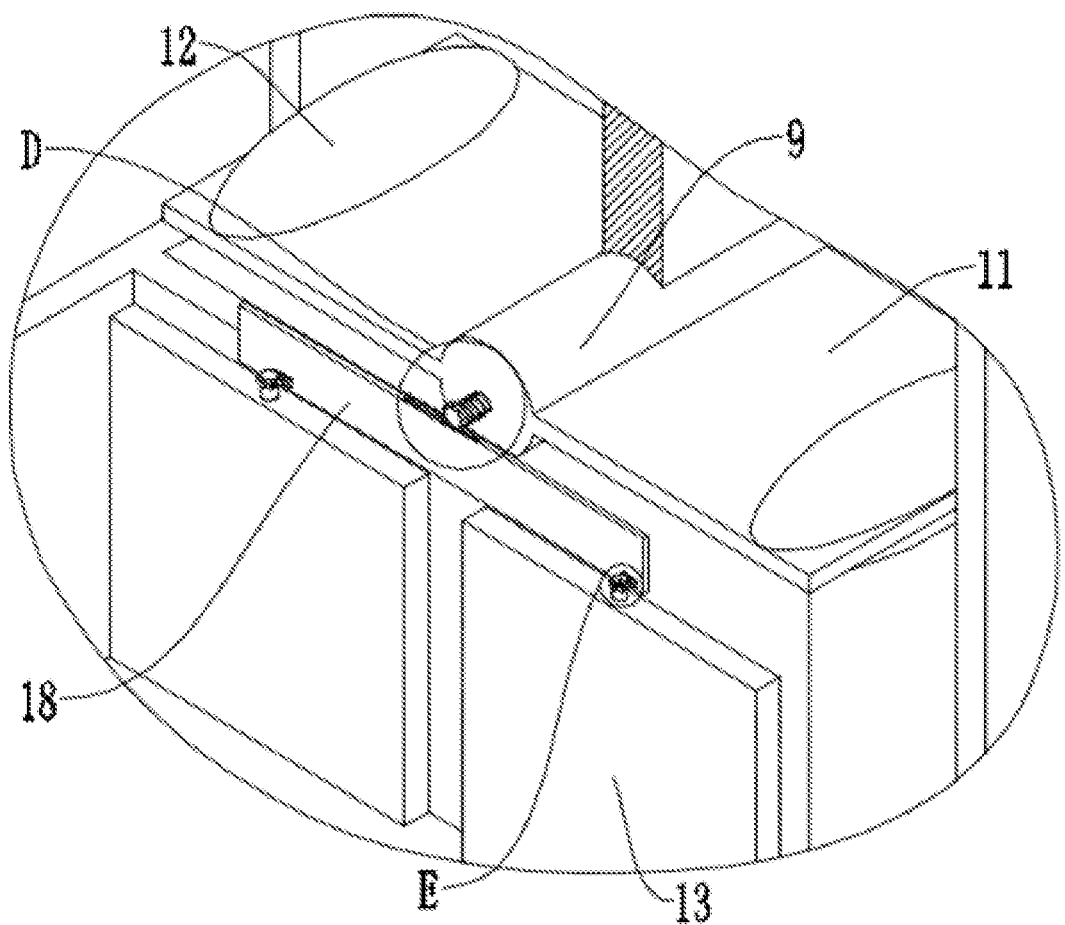
FIG. 8 is a schematic diagram illustrating a structure of a connection between an air changing component and a control component according to some embodiments of the present disclosure.

As shown in FIG. 4, FIG. 6, and FIG. 8, in some embodiments, the air changing component may include a first rotating shaft 9 and baffles 11 fixed to both sides of the first rotating shaft 9, respectively.

In some embodiments, the first rotating shaft 9 may be rotationally disposed on the two adjacent side wall plates of the two ventilation pipes 5, or the first rotating shaft 9 may be rotationally disposed on a side wall plate shared by the two ventilation pipes 5. The two baffles 11 may be located inside the two ventilation pipes 5, respectively. For example, the two baffles 11 may be located in the first ventilation pipe 5a and the second ventilation pipe 5b, respectively. When the baffles 11 are horizontal, the baffles 11 may block the ventilation pipe 5; when the baffles 11 are inclined, the ventilation pipe 5 may be ventilated.

As the air outside the trench 2 enters from the first ventilation opening 6 to the inside of the ventilation pipe 5, due to an L-shaped connection between the first ventilation opening 6 and the ventilation pipe 5, a wind power comes into contact with the baffles 11 and drives them to rotate around the first rotating shaft 9. The baffles 11 on both sides of the first rotating shaft 9 may be positioned inside each of the two ventilation pipes 5. In an initial state, the two baffles 11 may block the two ventilation pipes 5 respectively, preventing an airflow inside the two ventilation pipes 5. When the first rotation shaft 9 rotates, the two baffles 11 may rotate inside the ventilation pipes 5, putting the two ventilation pipes 5 into a ventilated state. In the present disclosure, the two baffles 11 may be used in conjunction with the control component to ventilate the two ventilation pipes 5, allowing the cold air to enter and cool the inside of the ventilation pipes 5, so as to slow the melting of the permafrost.

Figure 9:
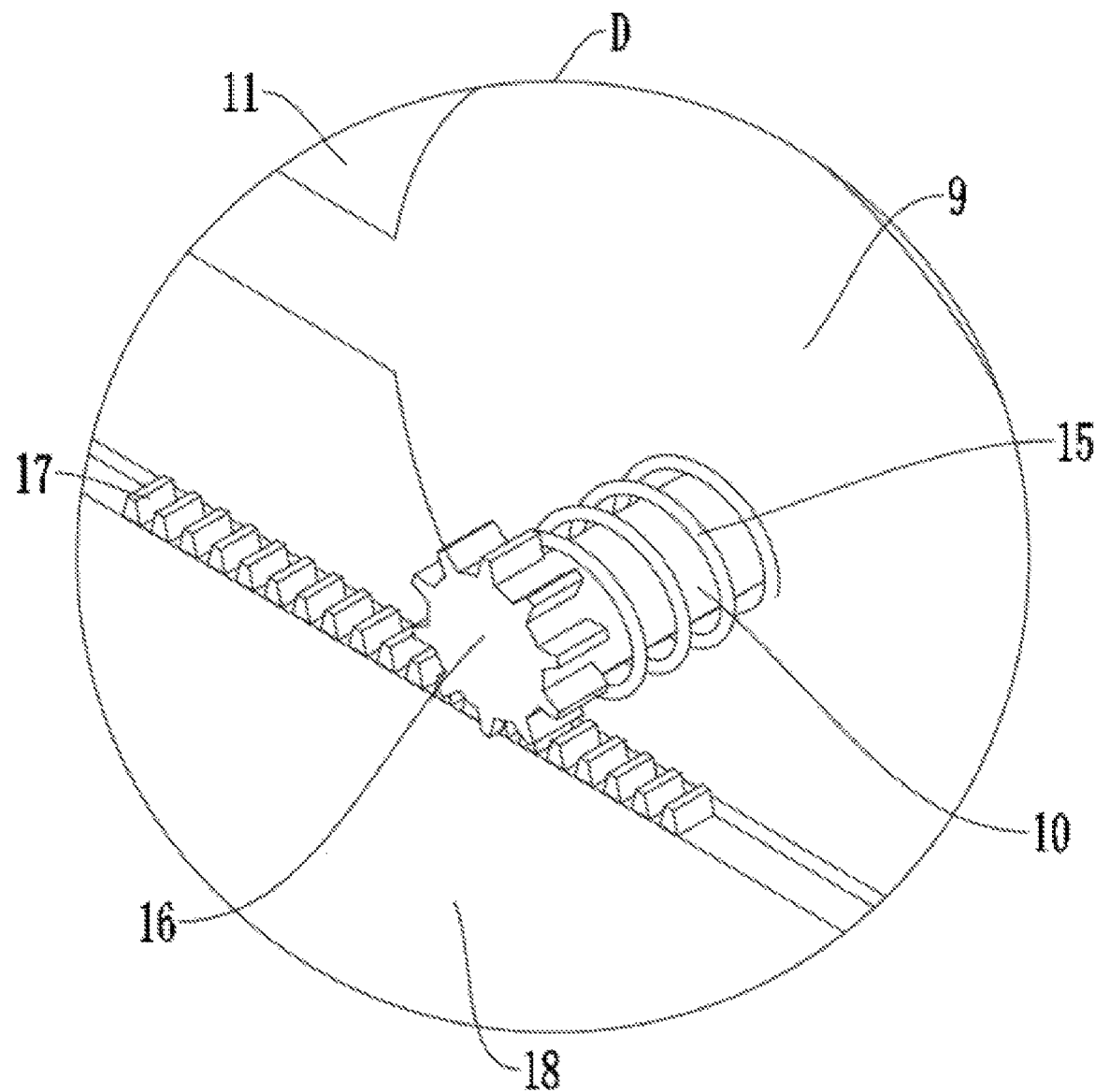
FIG. 9 is an enlarged schematic diagram at D in FIG. 8 according to some embodiments of the present disclosure.

As shown in FIG. 9, in some embodiments, each of two ends of the first rotation shaft 9 may also be fixedly connected to a connecting shaft 10, and the connecting shaft 10 may be rotationally installed on an inner wall of the ventilation pipe 5. A torsion spring 15 may be mounted on an outer wall of each connecting shaft 10. The torsion spring 15 may be a mechanical force storage structure that deforms to store an elastic potential energy or recover its shape and release the elastic potential energy. In some embodiments, the torsion spring 15 may be compressed, twisted, or rotated, and a material of the torsion spring 15 may include a tough elastic material made of a soft material.

When the connecting shaft 10 is rotated, the torsion spring 15 may deform to store the elastic potential energy. When the wind stops or the wind is not strong enough to overcome the elastic potential energy of the torsion spring 15, the torsion spring 15 may release the elastic potential energy so that the baffle plate 11 is restored to its original position. By setting the connecting shaft 10 and the torsion spring 15, the baffle plate 11 may be restored to its original position when the wind stops or the wind force is insufficient.

As shown in FIG. 8, in some embodiments, an elastic component 12 may be fixedly mounted to top and bottom surfaces of each baffle 11, and the elastic component 12 may be internally filled with a gas that expands with heat and contracts with cold. When the elastic component 12 thermally expands, the elastic component 12 may seal a gap between the baffle plate 11 and the ventilation pipe 5; when the baffle plate 11 is rotated and the elastic component 12 coldly contracts, the gap between the baffle plate 11 and the ventilation pipe 5 may be formed and the ventilation pipe 5 may be ventilated through the gap.

The gas filling the inside of the elastic component 12 may be any gas that expands with heat and contracts with cold. For example, the air, oxygen, hydrogen, carbon dioxide, and other gases that expands with heat and contracts with cold.

In some embodiments, the material of the elastic component 12 may also expand with heat and contract with cold. For example, the material of the elastic component 12 may include Polyvinyl Chloride (PVC), Polyvinylidene Chloride, Vinyl Acetate Copolymer, Polyoxymethylene (POM), Polytrifluoroethylene, Polycarbonate (PC), Polyamide (PA) or Polymethyl Methacrylate (PMMA), etc.

When the air that enters the inside of the ventilation pipe 5 from the outside of the trench 2 is cold air, the cold air may contact the elastic component 12, causing the elastic component 12 to contract, so that the air changing component is able to exchange air. When the air entering the inside of the ventilation pipe 5 from the outside of the trench 2 is hot air, the hot air may contact the elastic component 12, causing the elastic component 12 to expand. When the air entering the inside of the ventilation pipe 5 from the outside of the trench 2 is ambient temperature gas, the ambient temperature gas may contact the elastic component 12 and the elastic component 12 may not change. At this time, even if the air changing component rotates, the elastic component 12 may be capable of blocking the gap between the baffle 11 and the ventilation pipe 5, thereby preventing the hot air or the ambient temperature gas from entering the ventilation pipe. In this way, it may be avoided that the hot air or the room temperature gas comes into contact with an underlying multi-year frozen soil layer, melting the multi-year frozen soil layer, and thereby causing the main body of the pipeline 1 to undergo an uneven settlement, so as to ensure reliability and stability. In winter, the temperature of the air outside the trench 2 may be minus thirty degrees to minus fifty degrees, and the elastic component 12 in the ventilation pipe 5 on an inlet side may contract, so that the cold air enters the support frame 3 to complete the heat exchange. After the heat exchange, the temperature inside the trench 2 may rise less, and the elastic component 12 inside the ventilation pipe 5 on the air outlet side may remain a contracted state, and may not block the gap between the baffle plate 11 and the ventilation pipe 5, ensuring that the air outlet is smooth.

In the present disclosure, by fixing and installing the elastic component on the top and bottom surfaces of each baffle, the hot air or the room temperature gas may not come into contact with the underlying multi-year frozen soil layer, ensuring the reliability and stability of the pipeline support device.

Embodiment 4

Embodiment 4 is a further optimization of the control component based on Embodiment 1.

As shown in FIG. 8, in some embodiments, the control component may include a connecting plate 18 driven by the first rotation shaft 9, the connecting plate 18 controlling each of two first windshields 13 through two groups of unidirectional driving structures. The two first windshields 13 may each control the switching of the two second ventilation openings 7. Thus, the control component may control the on/off of the two second ventilation openings 7 through the first rotation shaft 9.

Figure 12:
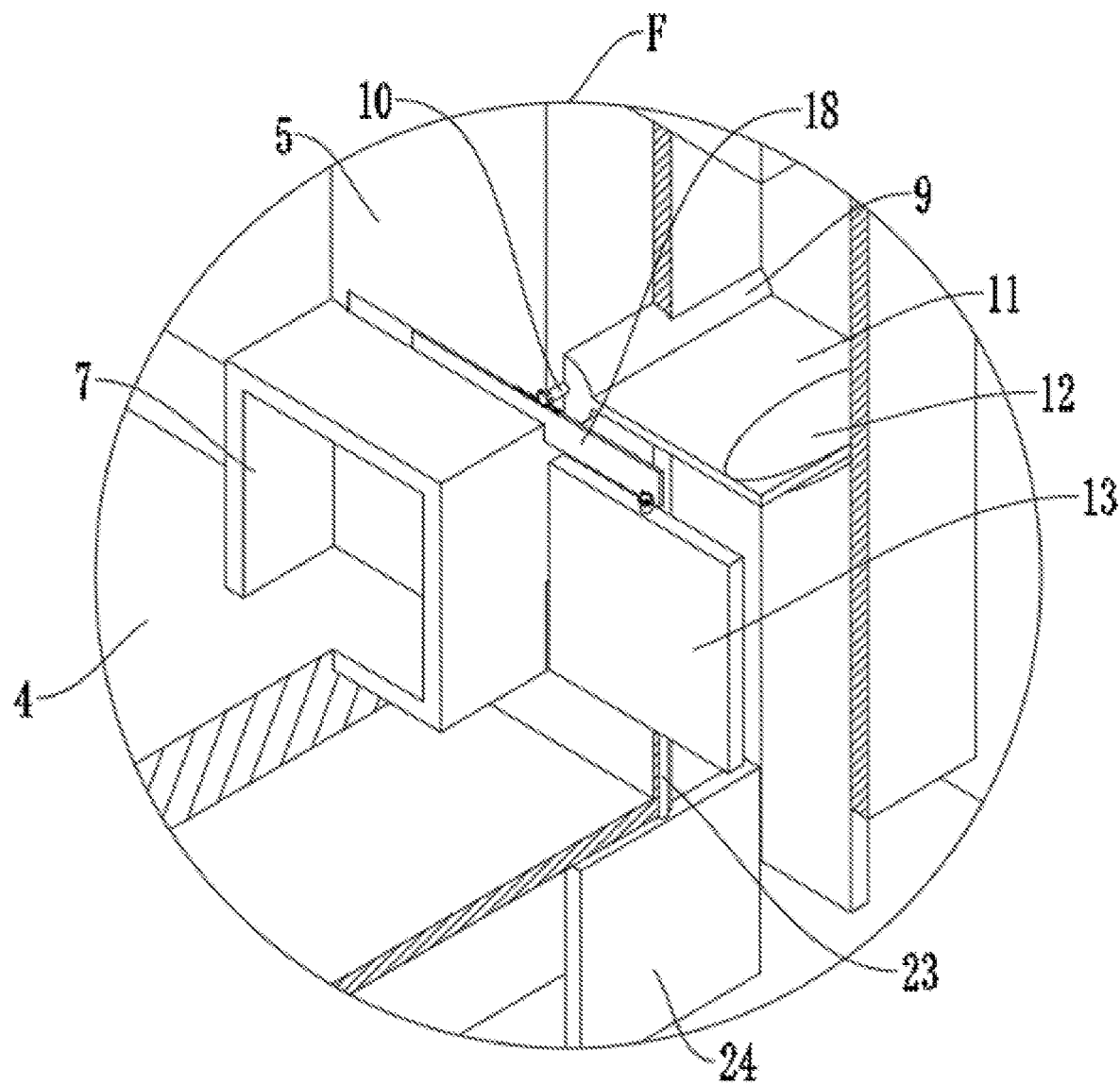
FIG. 12 is an enlarged schematic diagram at F in FIG. 7 according to some embodiments of the present disclosure.

As shown in FIG. 12, in some embodiments, a second windshield 24 may be fixedly connected to the bottom of each of the first windshields 13 by a connecting rod 23. The second windshield 24 may be perpendicular to the first windshield 13, and each of the two second windshields 24 may control the switching of the two third ventilation openings 8. In the initial state, the first windshield 13 may seal the second ventilation openings 7 so that the second ventilation openings 7 is not ventilated, and the second windshield 24 may not seal the third ventilation opening 8 so that the third ventilation opening 8 is open for ventilation. The initial state may be a state when no cold air is received and the pipeline support device does not perform heat exchange.

In some embodiments, when the rotation of the first rotation shaft 9 drives the connecting plate 18 toward one end, the connecting plate 18 may drive one of the first windshields 13 to rotate through one group of the unidirectional driving structures, while the other group of the unidirectional driving structures does not drive the other first windshield 13 to rotate. The rotating first windshield 13 may control the second ventilation opening 7 to open, while the rotation of the first windshield 13 may drive the connecting rod 23 and the second windshield 24 under the connecting rod 23 to close the third ventilation opening 8. In this way, it may be possible to make the second ventilation opening 7 on that side open and the third ventilation opening 8 close, while the second ventilation opening 7 on the other side (the side where the first windshield 13 does not rotate) is closed, and the third ventilation opening 8 is open. When the cold air outside enters through one of the ventilation pipes 5, and discharged from the third ventilation opening 8 opened on one side to the inside of the second chamber below the support partition 4, and then flows through the through hole opened inside the support partition 4 to the inside of the first chamber above the support partition 4. After that, the cold air may be discharged from the second ventilation opening 7 opened on the other side and discharged out of the trench 2 through the ventilation pipe 5, thereby completing the gas exchange.

As the second chamber below the support partition 4 is close to the trench 2, and the trench 2 is close to the permafrost layer, the temperature may be lower at the second chamber; and as the first chamber above the support partition 4 is close to the main body of the pipeline 1, and the main body of the pipeline 1 emits heat, the first chamber may have a higher temperature. With the above setting, the cold air outside may first contact the second chamber before being discharged from the first chamber. If the cold air outside first contacts the first chamber and then is discharged from the second chamber, it may be easy to make the hotter air of the first chamber contact the frozen soil layer below the trench 2, which not only leads to a failure of cooling and preventing the melting of the frozen soil layer, but will instead promote the melting of the frozen soil layer.

The first rotation shaft 9 is circled at D in FIG. 8. FIG. 9 is an enlarged schematic diagram at D in FIG. 8.

In some embodiments, as shown in FIG. 9, the first rotating shaft 9 may drive the connecting plate 18 to move to the left or to the right through a unidirectional driving structure. The unidirectional driving structure may include a gear 16 coaxial with the connecting shaft 10 and fixed to one side of the connecting shaft 10, and a first rack plate 17 fixed on a top of the connection plate 18. The gear 16 may be meshed with the first rack plate 17. When the first rotating shaft 9 drives the connecting shaft 10 to rotate, the connecting shaft 10 may drive the gear 16 to rotate, the gear 16 may drive the first rack plate 17 to move to the left or the right, and the first rack plate 17 may drive the connecting plate 18 to move to the left or the right. With the above-described driving structure, the first rotating shaft 9 may drive the connecting plate 18 to move to the left or to the right, and further control the switching of the two second ventilation openings 7.

Figure 10:
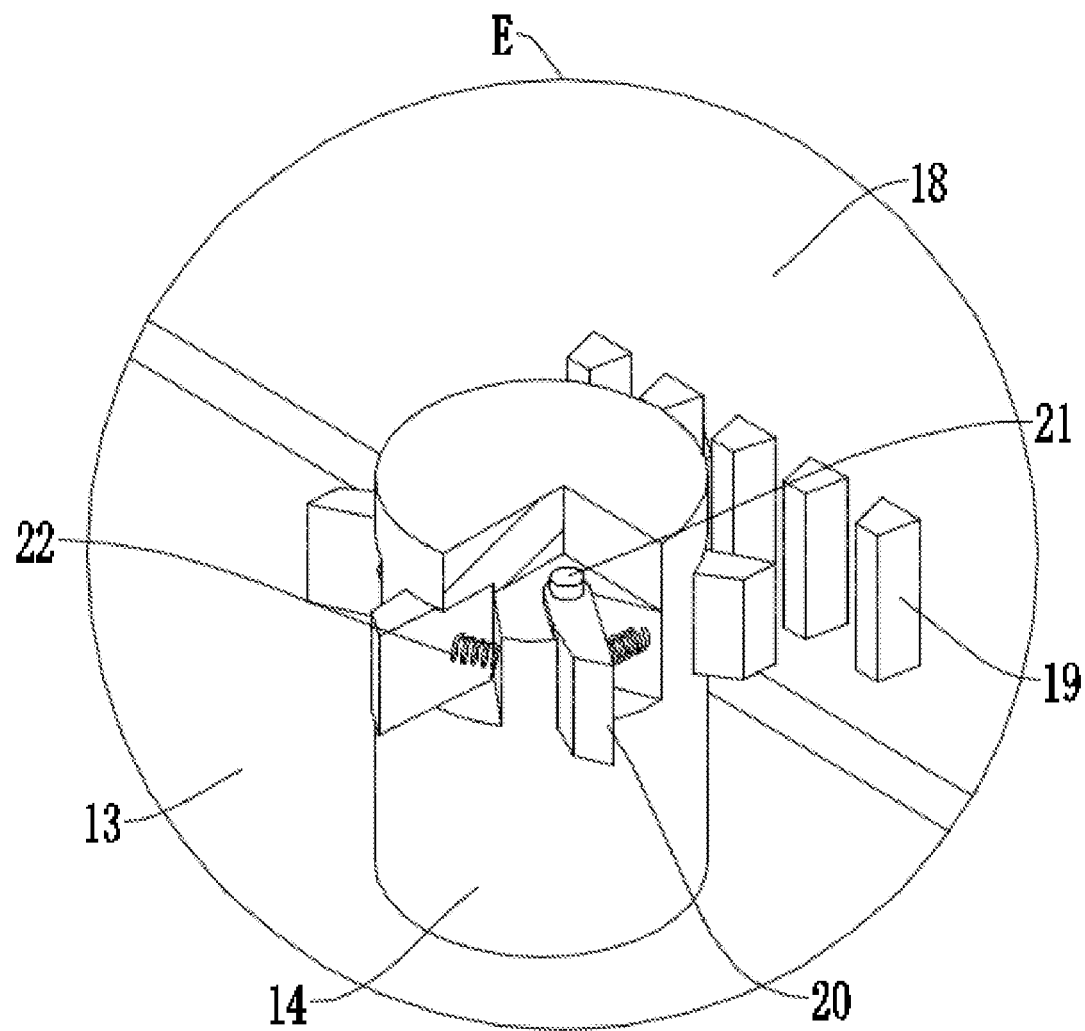
FIG. 10 is an enlarged schematic diagram at E in FIG. 8 (schematic diagram illustrating a connection structure of a rotating rod in a first ventilation pipe, a tooth block structure, and a second rack plate) according to some embodiments of the present disclosure.
Figure 13:
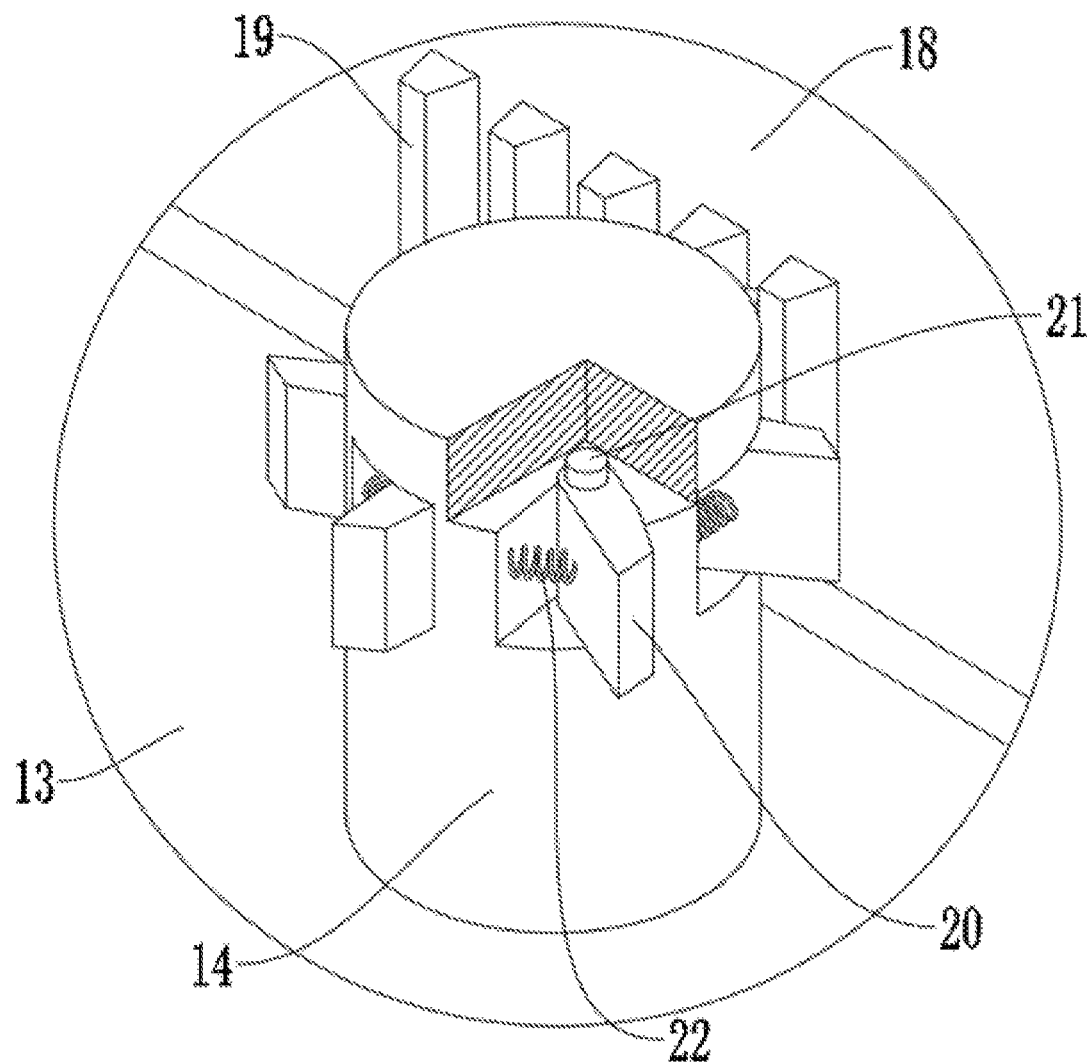
FIG. 13 is a schematic diagram illustrating a connecting structure of a rotating rod within a second ventilation pipe, a tooth block structure, and a second rack plate according to some embodiments of the present disclosure.

FIG. 8 at E circles the unidirectional driving structure between the connecting plate 18 and the first windshield 13. FIG. 10 is an enlarged schematic diagram at E in FIG. 8. FIG. 13 is a schematic diagram illustrating a connecting structure of a rotating rod within a second ventilation pipe, a tooth block structure, and a second rack plate according to some embodiments of the present disclosure.

In some embodiments, as shown in FIG. 8, FIG. 10, and FIG. 13, each group of unidirectional drive structures may include a second rack plate 19 fixed to the connecting plate 18, a rotating rod 14 fixed on the top of the first windshield 13 and the tooth block structure provided on a top of a rotating rod 14 and arranged in a circumferential direction along the rotating rod. The rotating rod 14 may be connected to the connecting plate 18 through the second rack plate 19 of the connecting plate 18 and the tooth block structure of the rotating rod 14. The tooth block structure may cooperate with the second rack plate 19 to form a unidirectional drive. A top sidewall of the rotating rod 14 may be provided with a groove arranged in the circumferential direction. Each tooth block structure may include a second rotating shaft 21 rotationally disposed within the groove, a tooth block 20 fixed on the second rotating shaft 21 to rotate with the second rotating shaft 21, and a spring 22 disposed between the tooth block 20 and an inner wall of the groove. The side of the tooth block 20 that protrudes from the rotating rod 14 may be a slope. The slope may cooperate with a tooth surface on the second rack plate 19. As shown in FIG. 10 and FIG. 13, in some embodiments, directions of the slopes on the tooth blocks 20 at the tops of two rotating rods 14 may be opposite to each other, and distribution positions of the springs 22 on the two rotating rods 14 may be opposite to the distribution positions of the tooth blocks. With the unidirectional driving structure described above, the rotation of the two first windshields 13 may be controlled, and the switching on and off of the two second ventilation openings 7 and the third ventilation openings 8 may be further controlled.

With respect to the unidirectional driving structure in the first ventilation pipe 5a alone, as shown in FIG. 10, when the second rack plate 19 is moved to the right side, the rotating rod 14 may be driven to rotate by a meshing action of the second rack plate 19 and the tooth block 20, thereby causing the first windshield 13 to rotate. When the second rack plate 19 is moved to the left, the second rack plate 19 may contact the slope of the tooth block 20, press the tooth block 20 to rotate around the second rotating shaft 21, and squeeze the spring 22 to produce deformation and store elastic potential energy. The tooth block 20 may contract to the inner wall of the groove, preventing the tooth block 20 from engaging with the second rack plate 19 and thus preventing a movement of the second rack plate 19 from driving the rotating rod 14 to rotate. When the second rack plate 19 is not in contact with the tooth block 20 at all, the spring 22 may release the elastic potential energy, causing the tooth block 20 to return to its original position.

Specifically with respect to the first ventilation pipe 5a and the second ventilation pipe 5b, when the wind blows toward the first ventilation pipe 5a, the cold air may enter the first ventilation pipe 5a; the cold air may contact the baffle 11, driving the baffle 11 to rotate around the first rotating shaft 9. The baffle 11 inside the first ventilation pipe 5a may rotate downward, the gear 16 may drive the first rack plate 17 to move toward the side away from the first ventilation pipe 5a (i.e., the left side in FIG. 10), and the second rack plate 19 may move accordingly. The second rack plate 19 inside the first ventilation pipe 5a may force the tooth block 20 to contract, the rotating rod 14 inside the first ventilation pipe 5a may not rotate, the first windshield 13 inside the first ventilation pipe 5a may not rotate, and the second ventilation opening 7 of the first ventilation pipe 5a may close, and the third ventilation opening 8 may open. As the directions of the slopes on the tooth blocks at the tops of two rotating rods 14 in the first ventilation pipe 5a and the second ventilation pipe 5b are opposite to each other, and the distribution positions of the springs 22 on the two rotating rods 14 are opposite to the distribution positions of the tooth blocks 20, simultaneously, the second rack plate 19 on one side of the second ventilation pipe 5b may drive the rotating rods 14 to rotate through a meshing action with the tooth blocks 20; the first windshield 13 in the second ventilation pipe 5b may rotate, and the second ventilation opening 7 of the second ventilation pipe 5b may open, and the third ventilation opening 8 may close. At this time, the cold air may be discharged from the third ventilation opening 8 in the first ventilation pipe 5a to the inside of the second chamber below the support partition 4, and the air above the support partition 4 may be discharged from the second ventilation opening 7 in the second ventilation pipe 5b, thereby completing the air exchange.

In the embodiment of the present disclosure, through a coordination of the ventilation component, the air changing component, and the control component, when the cold air enters the ventilation pipe, the gas may come into contact with the baffle, which drives the baffle to rotate around the first rotating shaft. When the baffle in one of the ventilation pipes rotates downward, the first baffle in that pipe may not rotate, while the first baffle in the other pipe rotates. This configuration allows the cold air to be discharged from the third ventilation opening of the ventilation pipe into the inside of the second chamber below the partition, and the air above the partition to be discharged from the second ventilation opening of the other ventilation pipe, thereby completing the air exchange process. Furthermore, it allows the cold air from outside to enter the device and cool the inside, preventing the continuous emission of heat from crude oil as it flows through the pipeline during transportation over an extended period, and preventing the situation where the pipeline, buried in the multi-year permafrost area, from causing the surrounding permafrost to melt due to the heat. By employing the gas heat exchange mechanism in the embodiments of the present disclosure, the melting of the permafrost layer may be minimized, thereby reducing a likelihood of bending and deformation of the pipeline.

Embodiment 5

Embodiment 5 further optimizes the first ventilation opening 6 based on Embodiment 2.

The first ventilation opening 6 in embodiment 2 may be oriented in two directions (as shown in FIGS. 2 and 11, the openings of the first ventilation opening 6 may be in opposite directions), so that the heat exchange is better accomplished when a wind direction of the cold air is exactly in the direction of the two openings of the first ventilation opening 6. However, when the wind direction of the cold air is in other directions (e.g., perpendicular to the direction of the two openings of the first ventilation opening 6), it may be difficult for the cold air to enter the ventilation pipe in large quantities.

Figure 14:
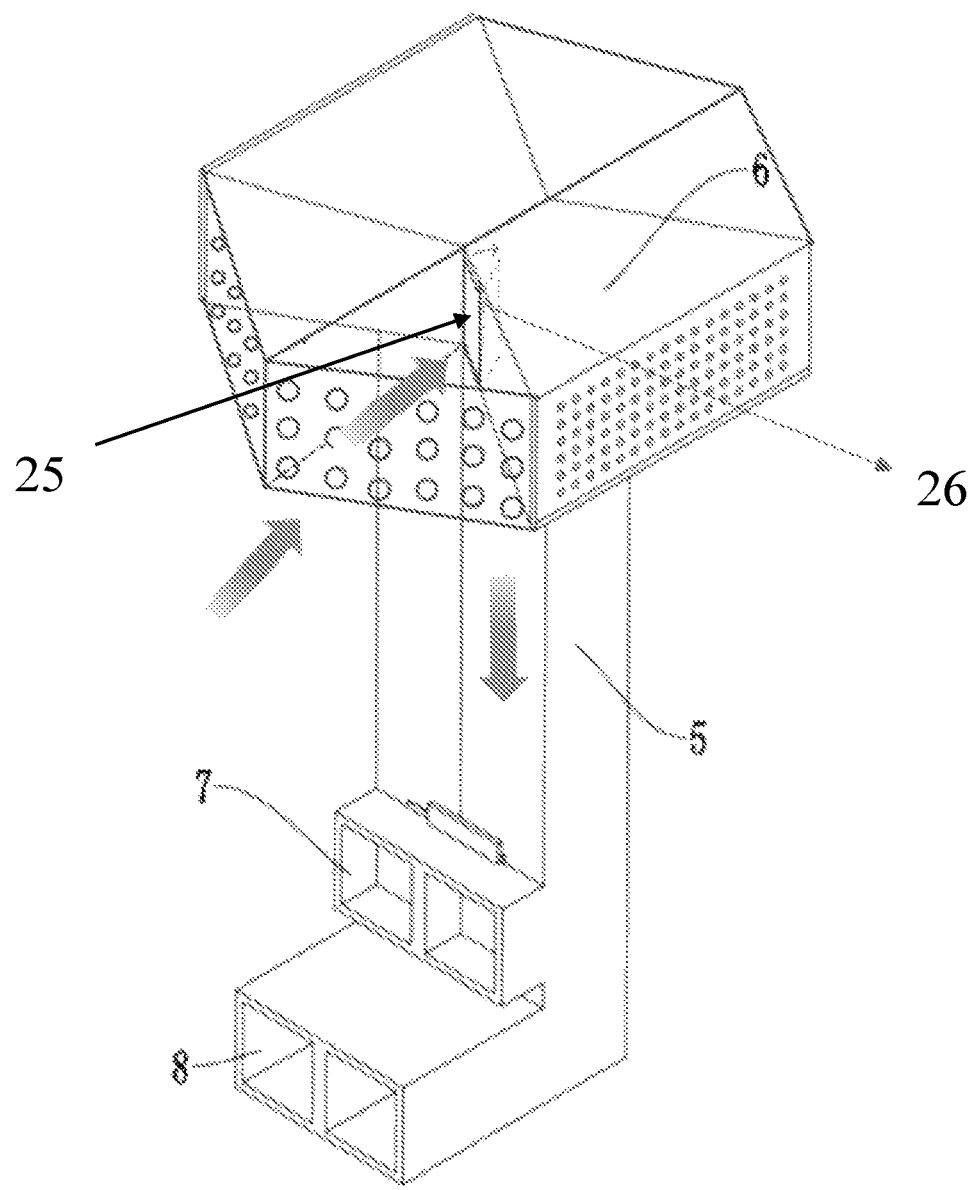
FIG. 14 is a schematic diagram illustrating a structure of a ventilation component including an air supply outlet according to some embodiments of the present disclosure.

Considering the above situation, as shown in FIG. 14, in some embodiments, an air supply outlet may be provided on both sides of the first ventilation opening 6, respectively, and an air supply partition may be provided between the air supply outlet and the first ventilation opening 6. The air supply partition between the air supply outlet and the first ventilation opening 6 may be provided with an air door 25 that opens toward an inside of the air supply outlet, and a door shaft of the air door 25 may be provided with a torsion spring. The torsion spring provided on the door shaft of the air door 25 and the torsion spring 15 may be of similar or the same structure and material. When there is wind blowing in, the air door 25 may be blown open toward the inside of the air supply outlet, and when there is no wind, the air door 25 may be automatically closed by the torsion spring.

In some embodiments, when the cold air enters from the direction of the air supply outlet, it may blow the air door 25 to open toward the inside of the air supply outlet, thereby entering the ventilation pipe 5. That is, when the wind direction of the cold air is different from the direction of the two openings of the first ventilation opening 6, the cold air may enter through the air supply outlet, and blow the air door 25 open so as to enter the ventilation pipe. At the same time, as there is no wind in the air supply outlet on the other side opposite to the wind direction of the cold air, the air door 25 on that side may be automatically closed under the action of the torsion spring to avoid the incoming cold air of the first ventilation opening 6 to overflow. As the air doors 25 in the two air supply outlet opposite each other on both sides of the first ventilation opening 6 are open toward the inside of the air supply outlet, the cold air may not overflow from the inside.

In the embodiment of the present disclosure, the above-described provision of the air supply outlet and the air door 25 may ensure that when the wind direction is not in the direction of the first ventilation opening 6, sufficient cold air may enter the gas heat exchange mechanism for heat exchange.

Embodiment 6

Embodiment 6 is a further optimization of the second chamber based on Embodiment 1.

The second chamber in Embodiment 2 may be a completely through space. However, as the cold air is denser than the hot air, the air tends to flow downward. In the through space like the second chamber, it may be difficult for the cold air to pass through the through holes in the support partition 4 and enter the chamber above to remove the heat from the main body of the pipeline 1 and complete the heat exchange.

In some embodiments, a dividing partition may be provided in the second chamber. The dividing partition may divide the second chamber into a plurality of sealed sub-second chambers, and each ventilation pipe corresponds to one of the plurality of sealed sub-second chamber. As shown in FIG. 2, a second partition may be provided at position P between the two ventilation pipes 5 in the second chamber. In some embodiments, one or more through holes may be provided in a portion of the support partition 4 within each sub-chamber of the second chambers.

In the embodiments of the present disclosure, the second chamber may be divided into a plurality of sealed sub-chambers by the second partition, so that in each sealed sub-chamber, once filled with cold air, the cold air may automatically flow into the chamber above through the through-holes, thereby improving the efficiency of the heat exchange.

Embodiment 7

Embodiment 7 is a further optimization of other components of the pipeline support device based on Embodiment 1.

Using a natural flow of the cold air for the gas heat exchange may be unstable, when the natural flow of the cold air produced by the gas heat exchange does not satisfy requirements, the gas heat exchange may be performed by actively inhale cold air through a negative pressure device for.

In some embodiments, the pipeline support device may further include a solar power unit, a storage battery, a cloud control unit, and a negative pressure device. It may be noted that one pipeline support device may support a section of the main body of the pipeline 1, and for the whole main body of the pipeline 1, a plurality of pipeline support devices may be used for supporting. Each pipeline support device may include a group of components including a solar power unit, a storage battery, a cloud control unit, and a negative pressure device.

The solar power generation unit may be disposed in an open area on the ground, and may be configured to convert solar energy into electrical energy. The solar power generation unit may include a solar photovoltaic component, a battery pack, a power distribution box, a monitor, etc. The electricity generated by the solar power generation unit may be transmitted to the storage battery for storage.

The storage battery may be configured to store the electrical energy and provide the electrical energy to the negative pressure devices or the cloud control unit of a pipeline support device. The negative pressure device may be provided at any of the third ventilation openings, and the pipeline support device may include one or more negative pressure devices. The negative pressure devices may be used to create a low-pressure environment by extracting air from a space (e.g., within the second chamber) for cooling and air exchange. In the embodiments of the present disclosure, the negative pressure devices may introduce the cool air from outside the trench 2 while discharging the hot air from the pipeline support devices.

The cloud control unit may be configured to communicate with a cloud server to receive a control instruction from the cloud server and control the negative pressure devices to draw in cold outside air for the gas heat exchange based on the control instruction.

The cloud control unit may be integrated into a processor. The processor may process data and/or information obtained from other devices or system components. The processor may execute the program instruction based on such data, information, and/or processing results to perform one or more of the functions described in the present disclosure. Merely by way of example, the processor may include a central processing unit (CPU), an application-specific integrated circuit (ASIC), etc., or any combination of the above.

The cloud server refers to a management server for the pipeline support device, which is managed by user or manufacturer of the pipeline support device, for example, to generate the control instruction. The cloud control unit may communicate with the cloud server through any one or more of a wired network or a wireless networks to exchange the data and/or information. The cloud server may be implemented on a cloud platform or provided virtually. Merely by way of example, the cloud platform may include a private cloud, a public cloud, a hybrid cloud, a community cloud, a distributed cloud, an internal cloud, a multi-tiered cloud, etc., or any combination thereof. The cloud server may be in communication with the cloud control unit in the pipeline support device.

The control instructions refer to instructions to control an operation of the negative pressure device. In some embodiments, the control instructions may include a turn-on cycle and an operation duration of the negative pressure device. For example, the control instructions may be to turn on the negative pressure device for 1 minute every 5 minutes. In some embodiments, the specific turn-on period and duration for the control instructions may be preset by technician.

In some embodiments, the cloud server may obtain the environmental information of a point where the pipeline support device is located over a network, and the environmental information may include a wind direction and a wind speed, etc. In response to a fact that at least one of the wind direction and the wind speed satisfies a negative pressure activation condition, the cloud server may send a control instruction for activating the negative pressure device to the cloud control unit corresponding to the pipeline support device.

In some embodiments, the negative pressure activation condition may include the wind direction being at an angle with the first ventilation opening 6 that exceeds a preset angle threshold, or the wind speed being below a preset wind speed value. The preset angle threshold and the preset wind speed value may be preset by technician.

It may be noted that when the angle between the wind direction and the first ventilation opening 6 is too large, an amount of cold air entering the first ventilation opening may be too small. When the wind speed is too low, the cold air may be unable to displace the partition in the ventilation pipe 5 to start the gas heat exchange process. Therefore, satisfying any one of the above conditions does not allow the gas heat exchange to cool the main body of the pipeline 1.

In the embodiment of the present disclosure, by setting up the negative pressure device and corresponding control instructions, when the gas heat exchange generated by the natural flow of the cold air does not satisfy the requirements, it may still be possible to achieve the gas heat exchange, and continually play a role in cooling and preventing melting and sinking.

In some embodiments, the pipeline support device may further include a temperature monitoring unit and an air flow monitoring unit. The temperature monitoring unit and the air flow monitoring unit may be provided in the first chamber.

The temperature monitoring unit may be used to monitor a temperature of the first chamber. In some embodiments, the temperature monitoring unit may include a temperature sensor, a temperature detecting instrument, etc.

The air flow monitoring unit may be used to monitor an air flow rate in the first chamber. In some embodiments, the air flow monitoring unit may include an air flow rate sensor, a gas flow rate tester, etc.

In some embodiments, the cloud control unit may be configured to: in response to determining the monitoring data of the temperature monitoring unit and the air flow monitoring unit satisfying a first preset condition, control the negative pressure device to inhale the cold air outside for the gas heat exchange. The monitoring data may include a temperature monitored by the temperature monitoring unit and the air flow rate monitored by the air flow monitoring unit.

In some embodiments, the first preset condition may include the temperature monitored by the temperature monitoring unit being higher than a first temperature threshold, and/or the air flow rate monitored by the air flow monitoring unit being lower than a preset flow rate threshold. The first temperature threshold may be a threshold condition corresponding to the temperature monitored by the temperature monitoring unit, and the preset flow rate threshold may be a threshold condition corresponding to the air flow rate monitored by the air flow monitoring unit. The first temperature threshold and the preset flow rate threshold may be set in advance based on experience or an actual situation. When the first preset condition is satisfied, the cloud control unit may directly control the negative pressure device to work.

When the temperature within the first chamber is higher, or when the air flow rate in the first chamber is low or has not flowed for a long time, it may indicate that no cold air has entered for the heat exchange for a long time. In the embodiments of the present disclosure, in this situation, the negative pressure device may be directly controlled to actively draw in the cold air to prevent the permafrost from melting due to the high temperature in the pipeline support device. Moreover, a simple determination may be made without an aid of the cloud server and only by above threshold and the cloud control unit.

In some embodiments, the cloud control unit may further be configured to upload a monitoring data sequence of the temperature monitoring unit and a monitoring data sequence of the air flow monitoring unit to the cloud server according to a preset period. The preset period may be set to 1 day, 2 days, 5 days, etc. It may be noted that the preset period may not be set too long to avoid a situation of the monitoring data where no cold air enters for the heat exchange for a long period of time with.

The monitoring data sequence refers to a sequence of monitoring data composed in a chronological order. In some embodiments, the monitoring data sequence may include a sequence of temperature data monitored by the temperature monitoring unit and a sequence of air flow data monitored by the air flow monitoring unit.

In some embodiments, the monitoring data sequence may further include the data detected by the temperature monitoring unit and the air flow monitoring unit during periods of time when the negative pressure device is not activated.

Through the above monitoring data sequence, it may be determined whether the heat exchange and cooling are realized through the natural flow of air in the case that the negative pressure device doesn't actively inhale the cold air. If the monitoring data includes the data for the period of time when the negative pressure device is activated, the predicted future temperature data may also be the future temperature data in the case where the negative pressure device is used, which leads to a determination error. Therefore, using the data detected during the period when the negative pressure device is not activated may avoid the above determination error.

In some embodiments, the cloud server may be further configured to predict, based on the monitoring data sequences, the future temperature data of the first chamber through a temperature prediction model; in response to determining the future temperature data satisfying a second preset condition, generate control instructions and send the control instructions to the cloud control unit.

The future temperature data refers to the temperature data for the first chamber at a future time. The future temperature data may include the temperature data at a future time point or a sequence of temperature data for a future time period.

In some embodiments, the temperature prediction model may be a machine learning model. For example, a convolutional neural network model, Long Short-term Memory Networks (LSTM) model, a Recurrent Neural Network (RNN) model, etc.

An input to the temperature prediction model may include a monitoring data sequence. An output of the temperature prediction model may include the future temperature data for the first chamber.

In some embodiments, the temperature prediction model may be obtained by training a plurality of training samples with training labels. In some embodiments, the training samples may at least include a sample monitoring data sequence. The sample monitoring data sequence may be a sample monitoring data sequence formed by the temperature data sequence and an air flow data sequence monitored during a first historical time period. In some embodiments, the sample monitoring data sequence may also further the monitoring data of the temperature monitoring unit and the air flow monitoring unit during the period of time when the negative pressure device is not activated. The training label may be the temperature data detected during a second historical time period. The second historical time period may be after the first historical time period.

In some embodiments, a training process of a temperature prediction model may include: inputting sample monitoring data into an initial temperature prediction model to obtain future temperature data output by the initial temperature prediction model; constructing a loss function based on the output of the initial temperature prediction model and the training label; updating parameters of the initial temperature prediction model based on the loss function; and obtaining a trained temperature prediction model in response to a training completion condition is satisfied. The training completion condition may include one or more of a loss value of the loss function being less than a preset loss value, the loss value reaching a minimum value, or the loss value remaining constant for a number of consecutive times, etc.

In some embodiments, the input to the temperature prediction model may further include outside weather information and position information. The outside weather information refers to weather information out of trench 2. The outside weather information may include data related to a temperature, a wind, a wind direction, an air pressure, a humidity, a precipitation, and other data out of trench 2. The position information is information about the position where the pipeline support device is located, and the position information may include a latitude, a longitude, an elevation, and other information.

Outside weather conditions and information about the position of the pipeline support device (e.g., an altitude, etc.) may affect a heat flow and a temperature change. As such, the future temperature data prediction may be made more accurate by inputting the outside weather information and position information into the temperature prediction model.

In some embodiments, the training samples of the temperature prediction model may further include sample outside weather information and sample position information.

In some embodiments, the cloud server may be configured to determine whether the future temperature data satisfies the second preset condition. The future temperature data may be obtained through the above-mentioned temperature prediction model.

In some embodiments, in response to the future temperature data satisfy the second preset condition, the cloud server may be configured to generate and send the control instructions to the cloud control unit. The cloud control unit may further control the negative pressure device to activate based on the control instructions.

In some embodiments, the second preset condition may include predicting that the obtained future temperature data exceeds a second temperature threshold. The second temperature threshold condition may be a threshold corresponding to the future temperature data, and the second temperature threshold may be the same as or different from the first temperature threshold. In some embodiments, if the future temperature data consists of a future temperature sequence, the cloud server may be configured to, in response to an existence of a future time point in the sequence of future temperatures with a temperature greater than the second temperature threshold, generate a control instruction and send the control instruction to the cloud control unit.

In some embodiments, if the temperatures at all future time points in the future temperature sequence are not greater than the second temperature threshold, but the temperature fluctuates greatly between time points in the future temperature sequence, the cloud server may be configured to issue an alert indicating that there is a problem with the pipeline support device.

In the embodiments of the present disclosure, dynamically predicting future temperature changes through the prediction model allows for a proactive inhale of the cold air before the temperature rises, ensuring that the permafrost does not melt.

In some embodiments, the cloud server may be further configured to: obtain a storage capacity of the storage battery of at least one candidate pipeline support device, and take a candidate pipeline support device corresponding to the storage battery with the storage capacity less than a power threshold as a target support device; obtain the future temperature data corresponding to the pipeline support device adjacent to the target support device; determine, based on the future temperature data corresponding to the at least one candidate pipeline support device, cooperative control instructions; and control, based on the cooperative control instructions, one or more of the negative pressure devices in the at least one candidate pipeline support device to inhale the cold air from outside.

The power threshold refers to a power value used to determine whether a cooperative gas heat exchange is required. The target support device may be the pipeline support device whose storage capacity is insufficient and require additional supports. When the storage capacity of the battery is less than the power threshold, the storage capacity of this pipeline support device may not be sufficient to support the negative pressure device to operate, and therefore the additional support is required to maintain the operation of the negative pressure device. The additional support refers to a situation where, due to the insufficient storage capacity, the pipeline support device needs to be supported by the adjacent piping support device to complete the gas heat exchange process that needs to be completed by itself.

The future temperature data corresponding to a plurality of pipeline support device adjacent to the target support device may be obtained by the temperature prediction model.

The cooperative control instruction refers to an instruction that controls a plurality of adjacent support devices corresponding to the negative pressure device to implement a cooperative gas heat exchange. The cooperative gas heat exchange refers to the negative pressure device corresponding to the plurality of adjacent support devices taking on more heat exchange tasks when the power of a certain storage battery is insufficient, so as to make an overall gas heat exchange of a certain section of the pipeline in compliance with the requirements.

In some embodiments, the cloud server may be configured to determine the control instruction for the negative pressure device of the adjacent support device based on a number of devices whose future temperature data exceeds the second temperature threshold among adjacent support devices of the target support device. The greater the number of devices exceeding the second temperature threshold, the shorter the turn-on cycle and the longer the operation time of each adjacent support device. The control instructions for the plurality of adjacent negative pressure devices may form a cooperative control instruction.

In the embodiment of the present disclosure, when a certain storage battery has an insufficiently storage capacity and is unable to actively inhale the cold air for the heat exchange, the cold air may be inhaled by the negative pressure device corresponding to an adjacent storage battery that has a sufficient storage capacity to cool down, e.g., cooling down by an upstream, so that negative pressure device the high temperature downstream may be relieved to some extent.

Embodiment 8

Embodiment 8 is a further optimization of the first ventilation opening 6 based on Embodiment 7.

Figure 15:
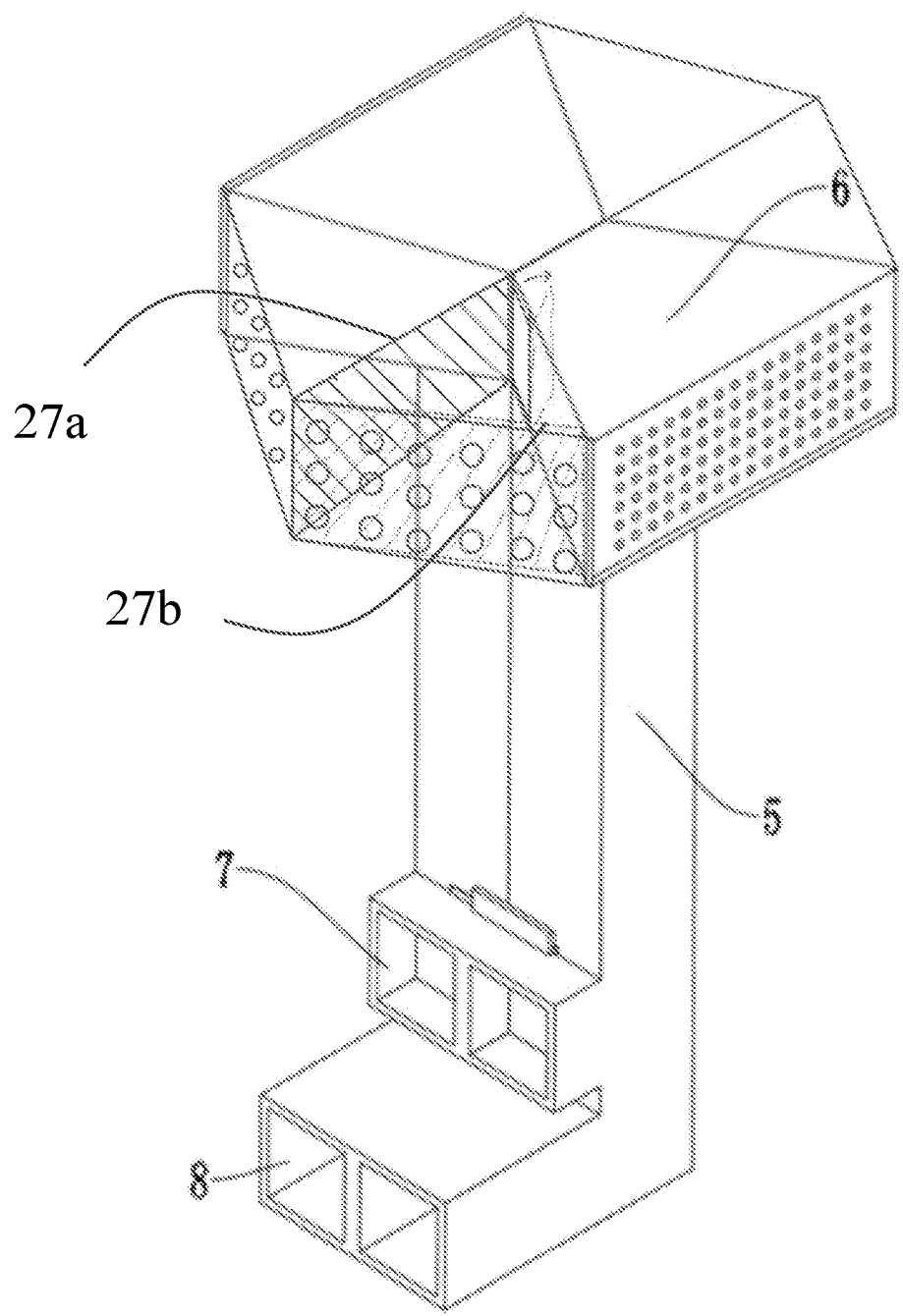
FIG. 15 is a schematic diagram illustrating a structure of an air supply outlet and an electric control baffle according to some embodiments of the present disclosure.

In some embodiments, an air supply outlet may be provided on both sides of the first ventilation opening 6, respectively, and the air supply outlet may be provided with an electric control baffle. The electric control baffle may be powered by electric energy provided by a storage battery. The electric control baffle is opened as shown by the solid line position at 26a in FIG. 15 and closed as shown by the dashed line position at 26a in FIG. 15. For more details about the air supply outlet, please refer to Embodiment 5 and the related descriptions.

In some embodiments, the cloud server may be further configured to determine whether the outside weather information satisfies the third preset condition. In response to determining external weather information satisfying the third preset condition, the cloud server may be configured to send a closing instruction to the cloud control unit to close the electric control baffle. The outside weather information may include the wind directions for the current and future time periods.

In some embodiments, the third preset condition may include that, in a current and future time period, an angle between the wind direction and a direction of the first ventilation opening 6 is oriented is less than a preset angle threshold, a wind speed exceeds a preset wind speed threshold, and the temperature is less than a preset temperature. In some embodiments, the wind direction at the current moment may be detected by setting a wind direction detection device, or the wind direction at the current and future periods of time may be directly obtained through the network. Then, based on the wind direction of the current and future periods of time, and the direction of two opposite directions of the first ventilation opening, the angle between the wind direction and the direction of the first ventilation opening 6 at the current and future time period may be determined.

When the third preset condition is satisfied, the cold air from the first ventilation opening may be sufficient to satisfy the requirement for the gas exchange, and there may be no need for air supply through the air supply outlet. At this time, the wind may be strong and the weather may be bad, and there may be more dust, foreign matter, etc. in the air that enters the first ventilation opening 6. A purpose of closing the air supply outlet may be to reduce an accumulation of the dust and other foreign matters in the channel. The greater a cross-sectional area for ventilation within the first ventilation opening 6, the greater a rate of dust accumulation. Therefore, the air supply outlet may be opened only when the air supply is needed.

In the embodiment of the present disclosure, by providing the electric control baffle, it may be possible to control the switching of the air supply outlet, so as to close the air supply outlet when the air supply is not needed, and to reduce the accumulation of dust and other foreign matters in the channel.

The above description is only a preferred embodiment of the present disclosure, and it should be noted that, for those skilled in the art, a plurality of improvements and amendments may be made without departing from the principles of the present disclosure, and these improvements and amendments shall also be regarded as within the scope of protection of the present disclosure.

The basic concepts have been described above, and it is apparent to those skilled in the art that the foregoing detailed disclosure serves only as an example and does not constitute a limitation of the present disclosure. While not expressly stated herein, those skilled in the art may make a plurality of modifications, improvements, and amendments to the present disclosure. The plurality of such types of modifications, improvements, and amendments are suggested in the present disclosure, so those types of modifications, improvements, and amendments remain within the spirit and scope of the exemplary embodiments of the present disclosure.

Also, the disclosure uses specific words to describe embodiments of the disclosure. such as "an embodiment", "an embodiment", and/or "some embodiment" means a feature, structure, or characteristic associated with at least one embodiment of the present disclosure. Accordingly, it should be emphasized and noted that two or more references in the present disclosure to "one embodiment" or "an embodiment" or "an alternative embodiment" in different places in the present disclosure do not necessarily refer to the same embodiment. In addition, certain features, structures, or characteristics of one or more embodiments of the present disclosure may be suitably combined.

Additionally, unless expressly stated in the claims, the order of the processing elements and sequences, the use of numerical letters, or the use of other names as described in the present disclosure are not intended to qualify the order of the processes and methods thereof. While some embodiments of the invention that are currently considered useful are discussed in the foregoing disclosure by way of various examples, it should be appreciated that such details serve only illustrative purposes, and that additional claims are not limited to the disclosed embodiments, rather, the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the presentation of the disclosure of the present disclosure, and thereby aiding in the understanding of one or more embodiments of the present disclosure, the foregoing descriptions of embodiments of the present disclosure sometimes group multiple features together in a single embodiment, accompanying drawings, or a description thereof. However, this method of disclosure does not imply that more features are required for the objects of the present disclosure than are mentioned in the claims. Rather, claimed subject matter may lie in less than all features of a single foregoing disclosed embodiment.

Some embodiments use numbers to describe the number of components, attributes, and it should be understood that such numbers used in the description of the embodiments are modified in some examples by the modifiers "about", "approximately", "substantially", or "generally" is used in some examples. Unless otherwise stated, the "approximately", "substantially" or "generally" indicates that a variation of ±20% is permitted. Correspondingly, in some embodiments, the numerical parameters used in the present disclosure and claims are approximations, which changes depending on the specific characteristics required by individual embodiments. In some embodiments, the numerical parameters should take into account the specified number of significant figures and use a general method of rounding. While the numerical ranges and parameters used to ascertain the breadth of their ranges in some embodiments of the present disclosure are approximations, in specific embodiments, such values are set to be as precise as possible within a feasible range.

For each patent, patent application, patent application disclosure, and other materials cited in the present disclosure, such as articles, books, specification sheets, publications, documents, etc., the entire contents of which are hereby incorporated herein by reference. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those set forth herein, the descriptions, definitions, and/or use of terms in the present disclosure shall prevail.

Finally, it should be understood that the embodiments described in the present disclosure are only used to illustrate the principles of the embodiments of the present disclosure. Other variations may also fall within the scope of the present disclosure. As such, alternative configurations of embodiments of the present disclosure may be considered to be consistent with the teachings of the present disclosure as an example, not as a limitation. Correspondingly, the embodiments of the present disclosure are not limited to the embodiments expressly introduced and described herein.

What is claimed is:

1. A pipeline support device for preventing melting and sinking based on gas heat exchange, wherein the pipeline support device is installed in a trench, and the pipeline support device includes a support frame and a gas heat exchange mechanism arranged on one side of the support frame, wherein
   a bottom of the support frame is fixed in the trench, a top of the support frame is an arc-shaped support surface configured to support a main body of the pipeline, and
   a support partition is fixed inside the support frame; the support partition separates the bottom of the support frame to form an upper chamber and a lower chamber; wherein the two chambers include a first chamber close to one side of the main body of the pipeline and located at an upper portion, and a second chamber close to a bottom of the trench and located at a lower portion; the support partition is provided with a through hole;

the gas heat exchange mechanism includes two groups of ventilation components, a group of air changing component and a group of control component, wherein each group of the ventilation components includes a ventilation pipe, a top of each ventilation pipe being connected to a first ventilation opening, a middle-lower of the each ventilation pipe being provided with a second ventilation opening, and a bottom of the each ventilation pipe being provided with a third ventilation opening; wherein the second ventilation openings of the two ventilation pipes are both communicated with the first chamber, and the third ventilation openings of the two ventilation pipes are communicated with the second chamber; the air changing component is driven by cold air to open; when the air changing component is opened, the two ventilation pipes are used for ventilation, one of the two ventilation pipes being used as an air inlet pipe, and the other is used as an air outlet pipe; at the same time, the air changing component drives an action of the control component; the control component controls the second ventilation opening of the ventilation pipe which is used as the air inlet pipe to close and the third ventilation opening of the ventilation pipe which is used as the air inlet pipe to open, and controls the second ventilation opening of the ventilation pipe which is used as the air outlet pipe to open and the third ventilation opening of the ventilation pipe which is used as the air outlet pipe to close;

the air changing component includes a first rotating shaft and baffles respectively fixed on two sides of the first rotating shaft; wherein the first rotating shaft is rotatably arranged on two adjacent side wall plates of the two ventilation pipes, or the first rotating shaft is rotatably arranged on a side wall plate shared by the two ventilation pipes; and the two baffles of the air changing component are respectively located in the two ventilation pipes; and the control component includes a connecting plate driven by the first rotating shaft, wherein the connecting plate controls two first windshields respectively through two groups of unidirectional driving structures; and the two first windshields respectively control switches of the two second ventilation openings, a bottom of each first windshield is fixedly connected to a second windshield through a connecting rod; the second windshield is perpendicular to the first windshield, the two second windshields respectively control switches of the two third ventilation openings; in an initial state, the first windshield blocks the second ventilation openings, and the second ventilation openings are not ventilated, the second windshields do not block the third ventilation openings, and the third ventilation openings are opened for ventilation.

2. The pipeline support device for preventing melting and sinking based on gas heat exchange of claim 1, wherein the main body of the pipeline is fixed on the arc-shaped support surface through an arc-shaped hoop and a bolt.

3. The pipeline support device for preventing melting and sinking based on gas heat exchange of claim 1, wherein the pipeline support device is further provided with a through hole located on a side away from the second ventilation opening.

4. The pipeline support device for preventing melting and sinking based on gas heat exchange of claim 1, wherein the two ventilation pipes are arranged in parallel and adjacent to each other, and the first ventilation opening is a trumpet-shaped opening; opening directions of the first ventilation openings at the top of the two ventilation pipes are opposite to each other; an opening side of each of the two first ventilation opening is an orifice plate uniformly provided with through holes, and a bottom surface of the trumpet-shaped opening is a downward slope, a strip opening is provided between the orifice plate and the slope.

5. The pipeline support device for preventing melting and sinking based on gas heat exchange of claim 1, wherein each of two ends of the first rotating shaft is respectively fixedly connected to a connecting shaft, and the connecting shaft is rotatably installed on an inner wall of the ventilation pipe, a torsion spring is installed on an outer wall of the connecting shaft.

6. The pipeline support device for preventing melting and sinking based on gas heat exchange of claim 5, wherein a top surface and a bottom surface of each baffle are provided with an elastic component, respectively, and an interior of the elastic component is filled with gas that expands with heat and contracts with cold; when the elastic component expands, a gap between the baffle and the ventilation pipe is blocked.

7. The pipeline support device for preventing melting and sinking based on gas heat exchange of claim 1, wherein the first rotation shaft drives the connecting plate to move left and right through the unidirectional driving structure; wherein the unidirectional driving structure includes a gear coaxially fixed on one side of the connecting shaft and a first rack plate fixed on a top of the connecting plate, and the gear being meshed and connected to the first rack plate.

8. The pipeline support device for preventing melting and sinking based on gas heat exchange of claim 1, wherein each group of the unidirectional driving structure includes a second rack plate fixed on the connecting plate, a rotating rod fixed on a top of the first windshield, and a tooth block structure arranged on a top of the rotating rod and arranged in a circumferential direction along the rotating rod; the tooth block structure cooperating with the second rack plate to form a unidirectional driving; a top side wall of the rotating rod is provided with a groove arranged in the circumferential direction; each of the tooth block structures includes a second rotating shaft rotatably arranged in the groove, a tooth block fixed on the second rotating shaft and rotates with the second rotating shaft, and a spring arranged between the tooth block and an inner wall of the groove; one side of the tooth block protruding from the rotating rod is a slope, the slope cooperating with a tooth surface on the second rack plate; directions of the slopes on the tooth blocks at the tops of two rotating rods are opposite to each other, and distribution positions of the springs on the two rotating rods are opposite to the distribution positions of the tooth blocks.

* * * * *